US012446031B2

(12) United States Patent
Elshafie et al.

(10) Patent No.: US 12,446,031 B2
(45) Date of Patent: Oct. 14, 2025

(54) ADJUSTED UPLINK CANCELATION

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/173,019

(22) Filed: Feb. 22, 2023

(65) Prior Publication Data

US 2024/0284444 A1 Aug. 22, 2024

(51) Int. Cl.
*H04W 72/1268* (2023.01)
*H04W 72/23* (2023.01)
*H04W 72/541* (2023.01)

(52) U.S. Cl.
CPC ....... *H04W 72/1268* (2013.01); *H04W 72/23* (2023.01); *H04W 72/541* (2023.01)

(58) Field of Classification Search
CPC ............ H04W 72/1268; H04W 72/23; H04W 72/541
See application file for complete search history.

(56) References Cited

U.S. PATENT DOCUMENTS 11,071,128 B2 * 7/2021 Ang .................. H04W 72/1268

* cited by examiner

*Primary Examiner* — Kyaw Z Soe
(74) *Attorney, Agent, or Firm* — Procopio, Cory, Hargreaves & Savitch LLP

(57) ABSTRACT

The apparatus, in some aspects, may be a network node configured to transmit, based on a first UL communication associated with a first wireless device and a second UL communication associated with a second wireless device being scheduled for a same UL resource, a conditional cancellation indication (CCI) for the second UL communication of the second wireless device and to receive at least the first UL communication. The apparatus in some aspects, may be a wireless device configured to receive a CCI for an UL communication scheduled via a first UL resource, skip transmitting the UL communication via the first UL resource when a condition is met, and transmit the UL communication via the first UL resource when the condition is not met.

30 Claims, 12 Drawing Sheets

ADJUSTED UPLINK CANCELATION

TECHNICAL FIELD

The present disclosure relates generally to communication systems, and more particularly, to cancelation indications for uplink (UL) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus, in some aspects, may be a network node configured to transmit, based on a first UL communication associated with a first wireless device and a second UL communication associated with a second wireless device being scheduled for a same UL resource, a conditional cancellation indication (CCI) for the second UL communication of the second wireless device and to receive at least the first UL communication.

In an aspect of the disclosure, a method, a computer-readable medium, and an apparatus are provided. The apparatus in some aspects, may be a wireless device configured to receive a CCI for an UL communication scheduled via a first UL resource, skip transmitting the UL communication via the first UL resource when a condition is met, and transmit the UL communication via the first UL resource when the condition is not met.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
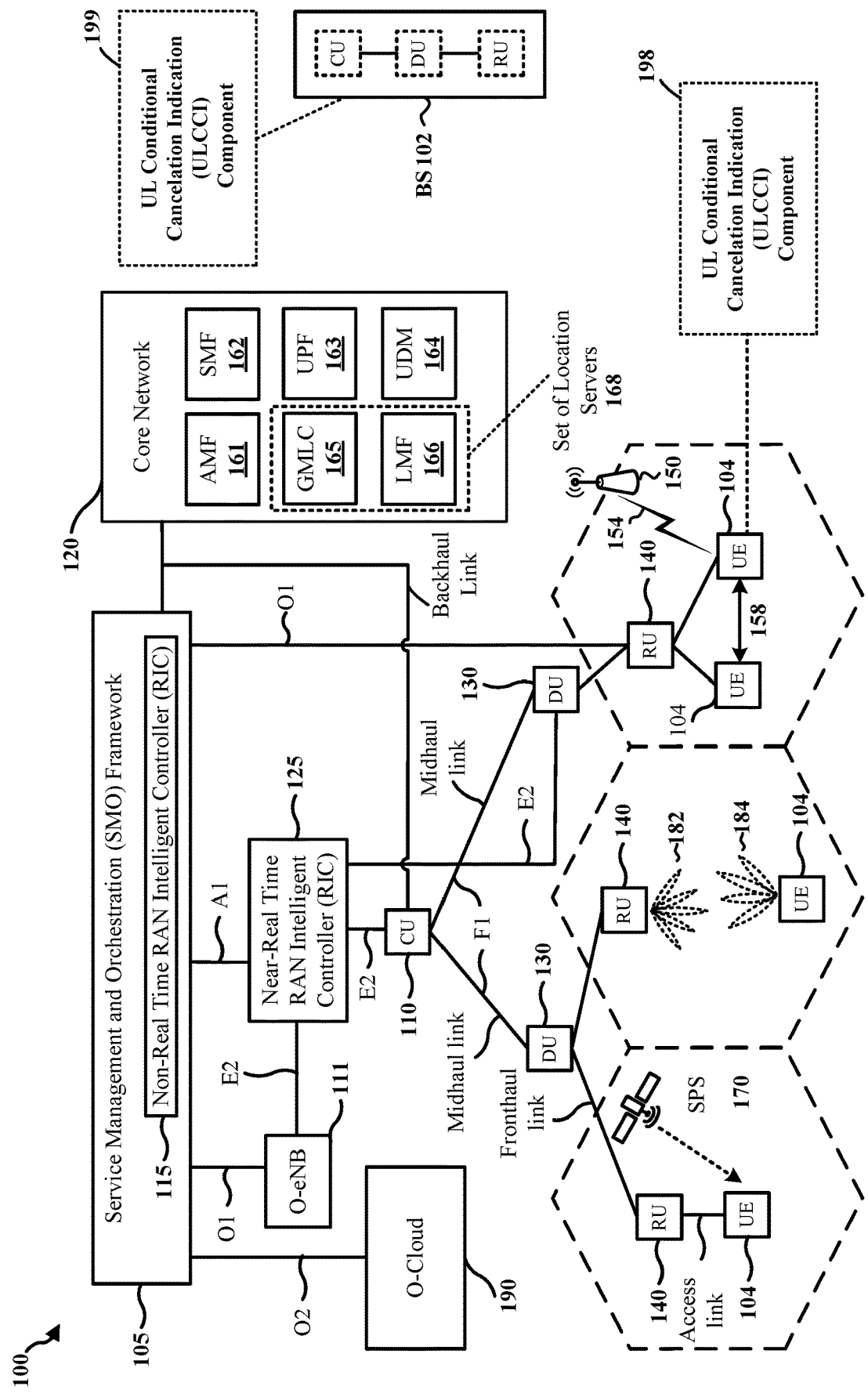
FIG. 1 is a diagram illustrating an example of a wireless communications system and an access network.

In some aspects of wireless communication, 5G NR (e.g., Rel 16 and higher), a network node (e.g., a base station, eNB, gNB, etc.) may transmit an uplink cancellation indication (ULCI) designed to improve URLLC performance for a first wireless device. For example, the network node may cancel an UL resource previously assigned to an eMBB service (for a second wireless device) for an URLLC UL transmission from the first wireless device. In some aspects, canceling eMBB UL transmissions in favor of URLLC UL transmissions may generally improve the URLLC performance without a significant impact on the eMBB performance (the eMBB UL transmission may be retransmitted before a packet delay budget (PDB) is exceeded). However, for services that may be less sensitive to delay than URLLC, but more sensitive to delay than eMBB (e.g., with a PDB of approximately 10 ms such as extended reality (XR) or other current or future services), canceling UL transmissions in favor of URLLC UL transmissions may degrade performance of the service more than the URLLC performance is improved. Using XR as an example, a scheduled URLLC UL transmission from a first wireless device may have 4 ms remaining of a nominal PDB of 5 ms and an XR UL transmission from a second wireless device may be scheduled for a same (or overlapping) set of resources and have 2 ms remaining of a nominal PDB of 10 ms. While the URLLC may have higher priority, in some situations, it may be the case that the XR service may be negatively impacted (e.g., may experience a failed transmission) without providing a corresponding benefit to the URLLC service (e.g., the URLLC UL transmission had sufficient time for a retransmission before the expiration of the PDB).

Accordingly, a method and apparatus may provide, based on identifying a first (URLLC) UL transmission that may conflict and/or collide with a second UL (XR or other service) transmission, a CCI to a wireless device. The CCI, in some aspects, may indicate the set of resources associated with the first UL transmission and a set of criteria for a wireless device to determine whether to cancel the second UL transmission. The set of criteria, in some aspects, may relate to one or more of a remaining PDB of the first transmission, a measured, and/or reported, channel quality (e.g., a signal-to-noise ratio (SNR), a signal-to-interference and noise ratio (SINR), or other channel quality measure), a power or energy, a delay parameter, or other characteristic of the first transmission that may be considered to determine an effect of canceling the second transmission in favor of the first transmission.

In some aspects, the method and apparatus may provide less delay compared to a solution that requires a network node to request a report from a wireless device about the experienced UL delay and then decide whether to cancel or not at the network node.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an UL conditional cancelation indication (ULCCI) component 198 that may be configured to receive a CCI for an UL communication scheduled via a first UL resource, skip transmitting the UL communication via the first UL resource when a condition is met, and transmit the UL communication via the first UL resource when the condition is not met. In certain aspects, the base station 102 may have an ULCCI component 199 that may be configured to transmit, based on a first UL communication associated with a first wireless device and a second UL communication associated with a second wireless device being scheduled for a same UL resource, a CCI for the second UL communication of the second wireless device and to receive at least the first UL communication. Although the following description may be focused on specific types of communications (e.g., URLLC, eMBB, or extended reality XR) or environments, the methods and apparatus may be applicable to additional types of communications and/or environments.

Figure 2:
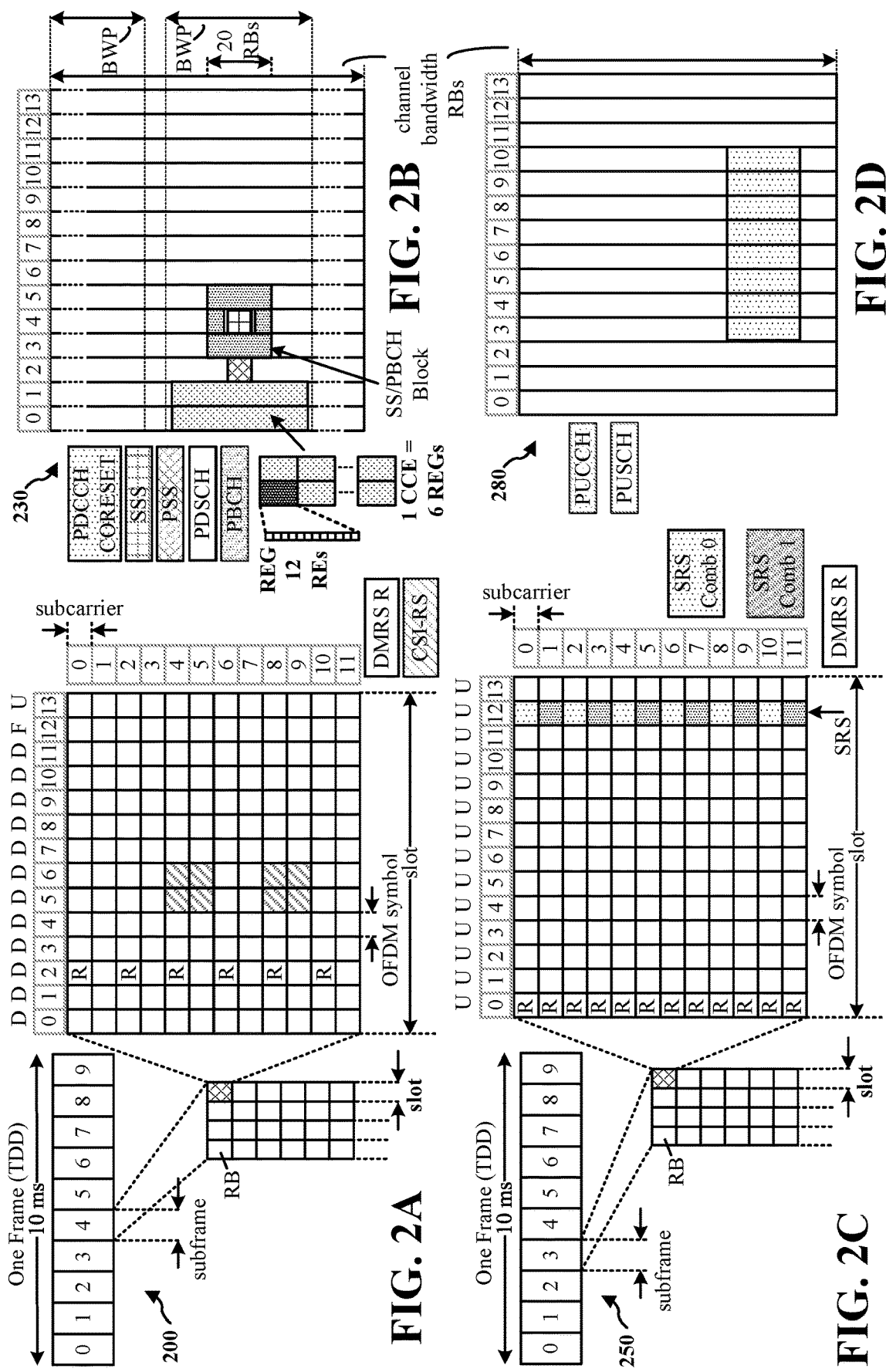
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5 G NR frame structure. FIG. 2B is a diagram 230 illustrating an example of DL channels within a 5 G NR subframe. FIG. 2C is a diagram 250 illustrating an example of a second subframe within a 5 G NR frame structure. FIG. 2D is a diagram 280 illustrating an example of UL channels within a 5 G NR subframe. The 5 G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5 G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5 G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
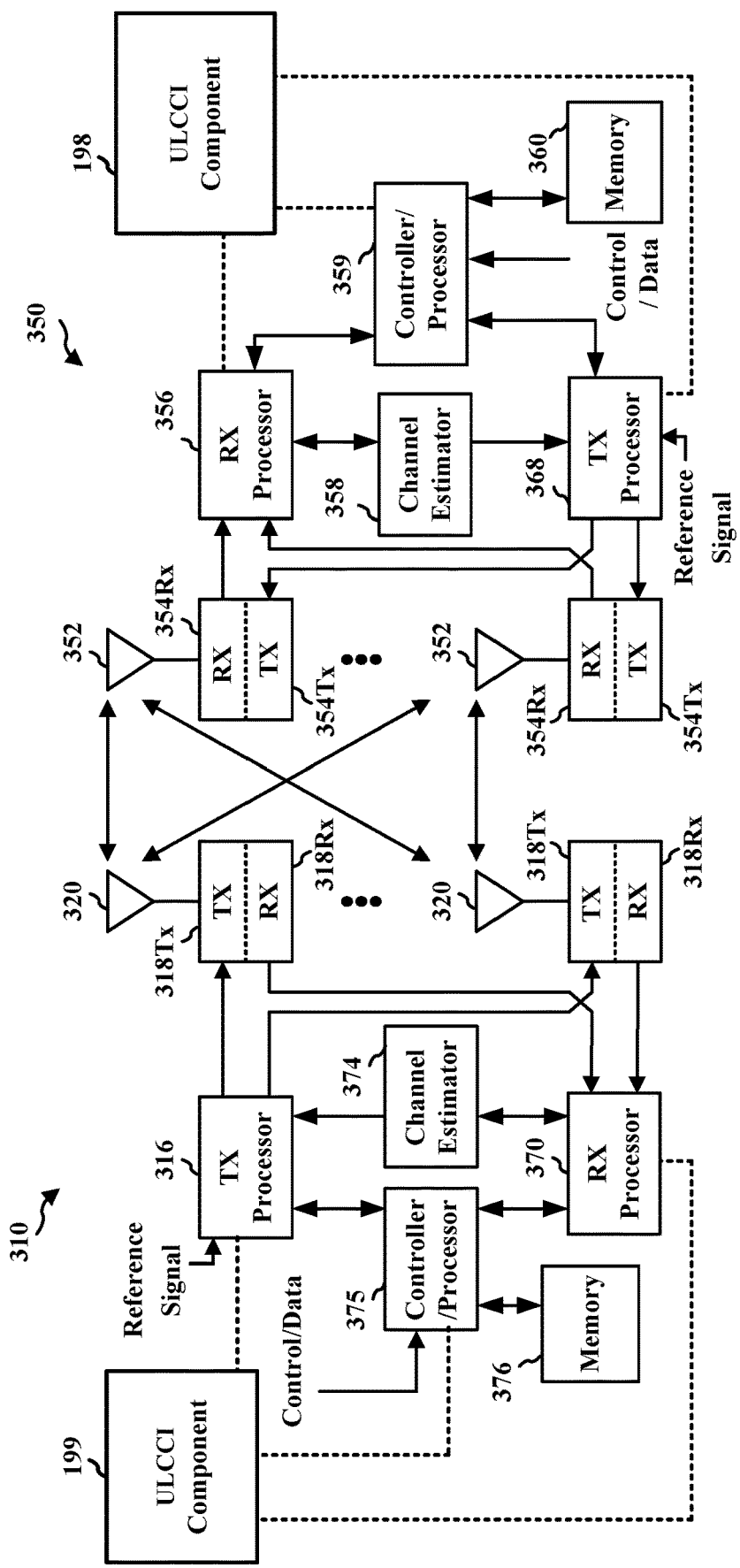
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 (L3) and layer 2 (L2) functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 (L1) functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ULCCI component 198 of FIG. 1.

At least one of the TX processor 316, the RX processor 370, and the controller/processor 375 may be configured to perform aspects in connection with the ULCCI component 199 of FIG. 1.

Some wireless traffic may refer to wireless communications for extended reality (XR) technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The traffic bursts may include different numbers of packets, e.g., the first XR traffic burst may have three packets and the second XR traffic burst may have two packets. Furthermore, the packets may vary in size, that is, packets within the first XR traffic burst and the second XR traffic burst may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $\frac{1}{60}$=16.67 ms periods. In another example, for 120 FPS video data, XR traffic bursts may arrive in $\frac{1}{120}$=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow, a UE may expect a first packet of the first XR traffic burst to arrive at time t0, but the first packet of the first XR traffic burst may arrive at time t1.

XR traffic may include multiple flows that arrive at a UE (or a base station) concurrently with one another (or within a threshold period of time). For instance, a second XR flow may have different characteristics than the first XR flow. For instance, the second XR flow may have XR traffic bursts with different numbers of packets, different sizes of packets, etc. In an example, the first XR flow may include video data and the second XR flow may include audio data for the video data. In another example, the first XR flow may include intra-coded picture frames (I-frames) that include complete images and the second XR flow may include predicted picture frames (P-frames) that include changes from a previous image.

Figure 4:
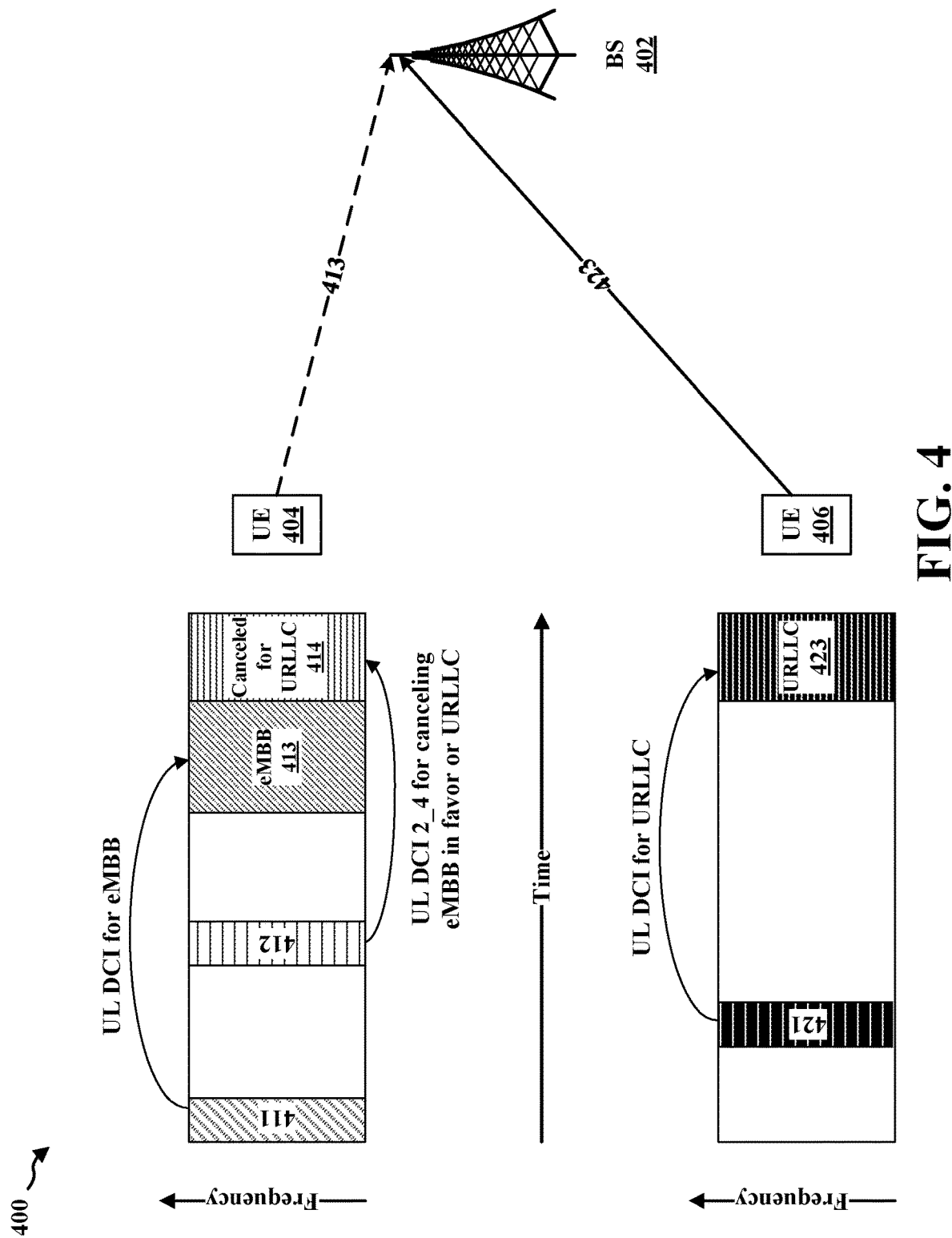
FIG. 4 is a diagram illustrating the use of an UL cancelation indication (ULCI) for canceling an eMBB UL transmission in favor of an URLLC UL transmission.

In some aspects of wireless communication, 5 G NR (e.g., Rel 16 and higher), a network node (e.g., a base station, eNB, gNB, etc.) may transmit an ULCI designed to improve URLLC performance for a first wireless device. FIG. 4 is a diagram 400 illustrating the use of an ULCI for canceling an eMBB UL transmission in favor of an URLLC UL transmission. A UE 404 may receive a first DCI 411 at a first time granting resources for an eMBB UL transmission 413. A UE 406 may receive a second DCI 421 at a subsequent time granting resources for an URLLC UL transmission 423. Based on the grant of resources for the URLLC UL transmission 423 conflicting, a base station 402 may transmit an ULCI 412 (e.g., a DCI format 2_4) to cancel a portion (e.g., resources 414) of the eMBB UL transmission 413. Accordingly, the UE 404 may transmit, and the base station 402 may receive, the beginning of the eMBB UL transmission 413 via the uncanceled portion of the resources granted in the first DCI 411 and the UE 406 may transmit, and the base station 402 may receive, the URLLC UL transmission 423 via the resources granted in the second DCI 421 for the UE 406 (and canceled for the UE 404 by ULCI 412).

As described above, the ULCI may be used by a network node to cancel an UL resource previously assigned to an eMBB service for an URLLC UL transmission. In some aspects (e.g., Rel 16), the ULCI may be indicated in a specific DCI format (e.g., DCI 2_4) to support UL cancellation for a PUSCH or SRS transmission. For example, the network node may schedule group-common DCI format 2_4 to cancel at least one UL resource previously assigned for an eMBB service to improve the URLLC performance. The group-common DCI format 2_4, in some aspects, may be scrambled based on a radio network temporary identifier (RNTI) such as a cancelation indication-RNTI (CI-RNTI). Accordingly, an ULCI (transmitted in a DCI format 2_4) may be used to notify one or more wireless devices (e.g., UEs) to cancel an UL transmission on some sets of time-and-frequency resources within a reference time and frequency region. In some aspects, ULCI may apply to PUSCH (including PUSCH repetition) and SRS.

In some aspects, XR is a service with delay sensitivity between a delay sensitivity associated with URLLC and a delay sensitivity associated with eMBB. For example, XR tolerances may be less delay sensitive than URLLC but more delay sensitive than eMBB. However, even though the delay sensitivity may be lower for XR traffic than URLLC traffic, in some situations XR traffic may be more critical, e.g., if its remaining UL budget is closer to the PDB for the traffic than an overlapping (in time, frequency, spatial beamforming, etc.) or conflicting/colliding URLLC traffic. For example, assuming an environment including at least two UEs, a first UE 'UE 1' with XR traffic and a remaining PDB of 2 msec and a nominal PDB of 10 msec (e.g., a typical value for UL pose/control), and a second UE 'UE 2' with URLLC that just began the URLLC transmission and experiences good SINR (or other measure of channel quality) for a link with a base station and has a remaining PDB of ~5 msec. In such an example, it may not be the case that it is better to cancel the XR traffic from UE1 and allow the URLLC traffic to be transmitted by UE 2. Accordingly, a naïve approach that cancels a first type of traffic based on relative nominal PDBs and ignores remaining PDBs and other current conditions may be suboptimal. For example, a network that assumes that an XR transmission is less critical to schedule than the more critical URLLC based on the nominal PDB instead of a remaining PDB may be suboptimal for XR applications, especially if the remaining PDB is approaching the delay budget (e.g., is nearing 0).

Accordingly, in the discussion of FIGS. 5-10, a conditional cancelation is described that may use a set of conditions for the cancelation, instead of cancelling the UL transmission based on the nominal PDB. For example, the network node may place one or more conditions on the cancellation based on one or more of an experienced uplink delay at a particular UE (e.g., known at the UE but not necessarily at the network node) and an UL SINR (e.g., known at the UE and estimated at the network node) for one or more UEs to provide adaptive control of cancelation. The one or more conditions (or set of criteria), in some aspects, may relate to one or more of a remaining PDB of the first transmission (e.g., a set of one or more remaining-PDB thresholds), a measured, and/or reported, channel quality (e.g., an SNR, an SINR, or other channel quality measure), a power or energy, a delay parameter, or other considerations (e.g., number of UEs using the same resources for UL and the importance of each transmission, if known at the network node) that may be considered to determine an effect of canceling the second transmission in favor of the first transmission. In some aspects, a power or energy condition or criteria may relate to a charging rate profile, a discharging rate profile, or an energy level profile, where a profile may include a current value associated with a current time and one or more predicted values associated with a corresponding one or more future times.

The method and apparatus, in some aspects, may avoid additional latency associated with granting resources for one or more delay status reports (DSRs) from one or more UEs, waiting for the one or more DSRs, and then determining whether to send out a ULCI. For example, delay status reporting would require the UE to obtain UL resources first to transmit the delay status report and then transmit the report. That is, the network node has to assign resources for the UE to report the delay then plan to assign resources to UEs (a plurality of UEs) accordingly. In some aspects, there may not be enough time for the network node to engage in this reporting process before determining whether to transmit and transmitting a ULCI (or, in accordance with some aspects of the disclosure, a CCI). Additionally, even with a DSR, the network node may be unable to make an optimal determination of whether to cancel a particular UL transmission from a particular UE without also considering a set of associated SINR conditions experienced at one or more UEs (e.g., the UE associated with the smaller-PDB (or URLLC) transmission and/or the UE associated with the larger-PDB (XR) transmission). Using the CCI, a network node may conditionally request UEs to cancel if there is still enough time for a subsequent transmission or retransmission before a PDB runs out. A DSR (or a remaining PDB value) may be indicated (by a UE receiving a CCI) if the UE cancels the indicated UL transmission and its remaining PDB is enough (e.g., based on a network node configuration of a delay threshold that is, in turn, based on a scheduler of the network node).

Figure 5:
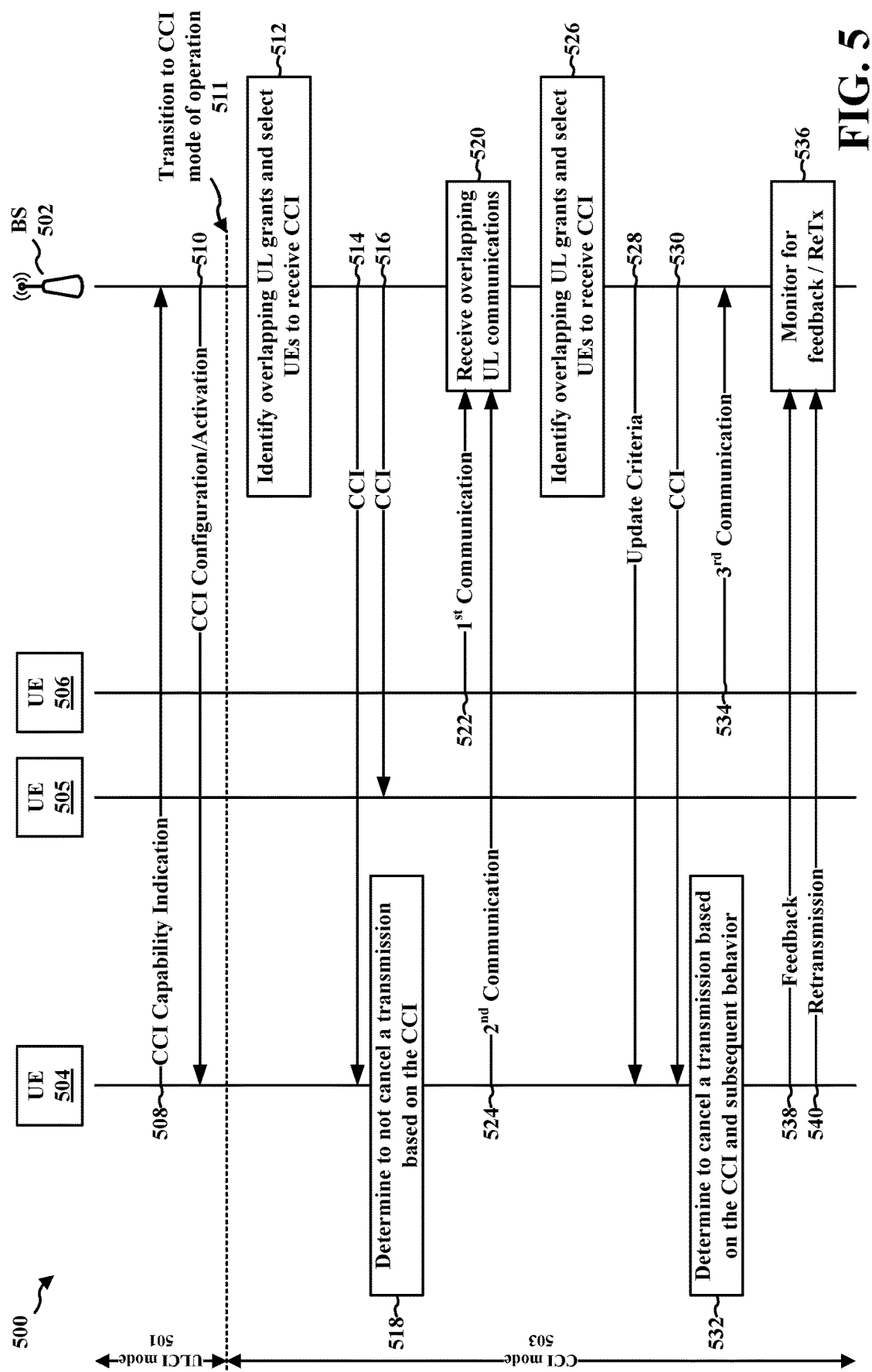
FIG. 5 is a call flow diagram illustrating the use of a CCI in accordance with some aspects of the disclosure.

FIG. 5 is a call flow diagram 500 illustrating the use of a CCI in accordance with some aspects of the disclosure. A UE 504 (as an example of a wireless device) may operate in a ULCI mode of operation 501, e.g., a mode of operation associated with canceling UL transmissions based on an ULCI without conditions (without the possibility of, or capacity for, ignoring and/or declining the ULCI). In some aspects, the UE 504 may be one of a high-capability UE (eMBB), a wearable wireless device, a reduced capacity (RedCap) wireless device, an enhanced RedCap (eRedCap) wireless device, an IoT device, or an ambient IoT device (e.g., a radio frequency identification (RFID) device, or RFID tag, a backscatter device, etc.). In some aspects, the ambient IoT device may be one of a passive ambient IoT device, a semi-passive ambient IoT device, or an active ambient IoT device. In some aspects, a passive ambient IoT device may be an ambient IoT device with no energy storage, signal generation, of amplification capabilities, while a semi-passive ambient IoT device may also not have signal generation capabilities, but may include energy storage and may, or may not, have amplification capabilities (e.g., may, or may not, have a power amplifier (PA) or low-noise amplifier (LNA)). In some aspects, an active ambient IoT device may have energy storage and signal generation capabilities and may additionally have amplification capabilities.

The UE 504, in some aspects, may transmit, and a base station 502 (as an example of a network node, network device, or network entity) may receive, a CCI capability indication 508 indicating that the UE 504 is capable of accepting a conditional cancelation. In some aspects, the CCI capability indication 508 may not be transmitted and the UE 504 may be assumed to be capable of processing a CCI. For example, a UE that is not capable of determining whether to cancel an UL transmission based on a set of conditions associated with a CCI, may interpret a CCI (e.g., a DCI format 2_4 using reserved bits to indicate a set of conditions or a DCI form 2_4 that is associated with a pre-configured, or known, set of conditions) as a non-conditional ULCI, such that an UL transmission scheduled via resources indicated in the CCI may be canceled without considering the conditions.

After receiving the CCI capability indication 508 (or if the CCI capability indication 508 is not used/transmitted), the base station 502 may transmit, and UE 504 may receive, a CCI configuration/activation 510. Although not shown in call flow diagram 500, the UE 505 and the UE 506 (among a plurality of UEs in communication with the base station 502) may also exchange communications similar to CCI capability indication 508 and CCI configuration/activation 510 with the base station 502. The CCI configuration/activation 510, in some aspects, may be a configuration message associated with an L3 message (e.g., an RRC message) that configures the UE 504 to process CCI messages (e.g., transmitted using a DCI format 2_4). The CCI configuration/activation 510, in some aspects, may configure a set of conditions (or set of criteria) to apply upon receiving a CCI (e.g., DCI format 2_4) after an activation of a CCI capability (or CCI mode of operation). The set of conditions (or set of criteria) may be used by the UE 504, in some aspects, to determine whether to cancel an UL transmission associated with a received CCI and to determine a set of subsequent actions (e.g., whether to transmit one or more of a feedback indicating an acceptance or rejection of the cancelation, a DSR, or an indication of a remaining PDB). The set of conditions, in some aspects, may be updated via subsequent L3, L2, or L1 signaling (e.g., via RRC signaling, a MAC-CE, scheduling DCI or non-scheduling DCI) for application to subsequently received CCIs. In some aspects, the CCI configuration/activation 510 may configure a plurality of sets of conditions (e.g., an indexed list of sets of conditions) that may be activated (e.g., via an index into the indexed list) via subsequent L3, L2, or L1 signaling (e.g., via RRC signaling, a MAC-CE, scheduling DCI or non-scheduling DCI) for application to subsequently received CCIs.

The CCI configuration/activation 510, in some aspects, may be a configuration message associated with an L3 message (e.g., an RRC message) that configures the UE 504 to receive CCI messages (e.g., transmitted using an extended DCI (eDCI) form at 2_4, a new/different DCI format configured for CCI, or other CCI signaling) as described below). Configuring the UE 504 to receive CCI messages, in some aspects, may include indicating the structure (or format) associated with CCI signaling (e.g., a structure of the eDCI format 2_4, a configuration for reserved bits of a DCI format 2_4, or a structure associated with other CCI signaling). In some aspects, the CCI configuration/activation 510 may configure the UE 504 for a CCI-only mode of operation or a CCI and ULCI mode of operation. For example, the CCI configuration/activation 510, in some aspects, may enable the CCI-only mode of operation causing the UE 504 to monitor for a CCI (e.g., via an eDCI format 2_4, a new DCI format for CCI, or a different type of CCI signaling) while refraining from monitoring for a ULCI. Additionally, the CCI configuration/activation 510, in some aspects, may enable the CCI and ULCI mode of operation causing the UE 504 to monitor for a CCI (e.g., via an eDCI format 2_4, a new DCI format for CCI, or a different type of CCI signaling) while also monitoring for a ULCI (e.g., via an DCI format 2_4). In some aspects, the CCI and the ULCI may be distinguished by one or more of: sets of resources associated with each type of CI (e.g., a first set of RBs may be associated with ULCI signaling while a second, distinct, set of RBs may be associated with CCI signaling) or a scrambling code used for each type of CI (e.g., using a CI-RNTI for ULCI signaling and CCI-RNTI for CCI signaling).

In some aspects, CCI configuration/activation 510 may additionally (or alternatively) activate, at the UE 504, the mode of operation associated with CCIs (e.g., a CCI mode of operation 503) configured by the CCI configuration/activation 510 (or a CCI mode of operation configured by prior L3 signaling as described above or an otherwise known CCI mode of operation). The CCI configuration/activation 510 used to activate the CCI mode of operation, in some aspects, may be associated with one of L3, L2, or L1 signaling (e.g., via RRC signaling, a MAC-CE, scheduling DCI or non-scheduling DCI). In some aspects, the CCI configuration/activation 510 used to activate the CCI mode of operation 503 may further include an indication of one or more updated condition (or criteria) in the set of conditions (or set of criteria) for determining whether to cancel an UL transmission associated with a CCI (and to determine subsequent behavior relating to retransmitting a canceled UL transmission or transmitting one or more of a feedback indicating an acceptance or rejection of the cancelation, a DSR, or an indication of a remaining PDB). After the base station 502 transmits the CCI configuration/activation 510 activating the CCI mode of operation, the UE 504 may transition, at 511, to operating in the CCI mode of operation 503.

In some aspects, the CCI capability indication 508 and the CCI configuration/activation 510 may be omitted and the UE 504, the UE 505, and the UE 506 may be configured to identify a received cancelation indication as one of a ULCI (e.g., DCI format 2_4) or a CCI (e.g., an eDCI format 2_4 or other CCI signaling) based on a RNTI associated with (e.g., used to scramble) the cancelation indication. For example, a CI-RNTI may be associated with a ULCI while a different CCI-RNTI may be associated with a CCI. If the CCI configuration/activation 510 is omitted, the CCI signaling for each conditional cancelation occasion, in some aspects, may include a set of conditions and/or criteria specific to that occasion.

Figure 6:
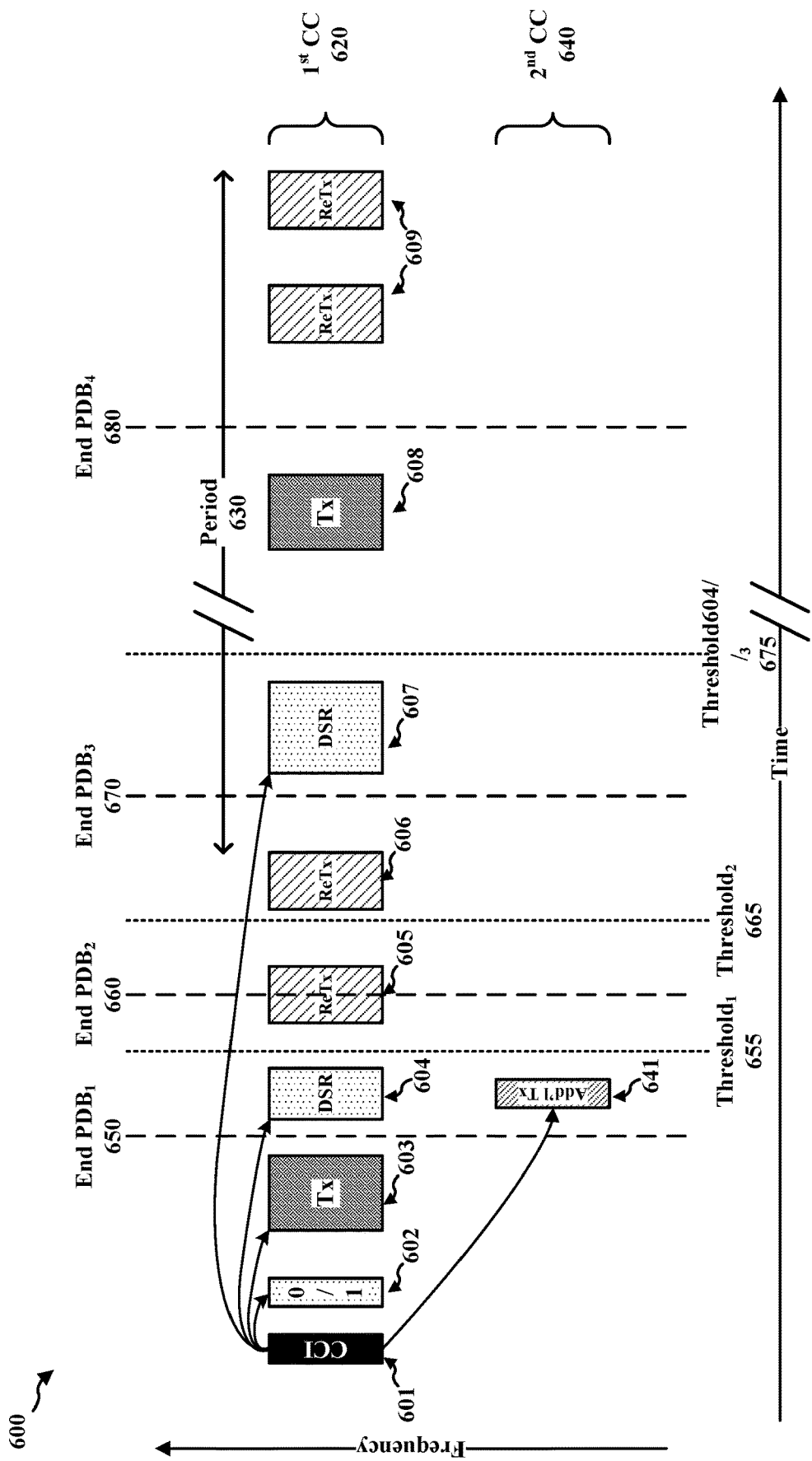
FIG. 6 is a diagram illustrating different resource allocations that may be relevant to the CCI in accordance with some aspects of the disclosure.

FIG. 6 is a diagram 600 illustrating different resource allocations that may be relevant to the CCI in accordance with some aspects of the disclosure. Elements of diagram 600 are used to illustrate concepts discussed in relation to the remainder of FIG. 5. In some aspects, the elements of diagram 600 may be related to a single UE, e.g., the UE 504 and may be used to refer to different instances of a CCI transmission and reception. For example, the UE 504 may be configured with periodic, or semi-persistent scheduling resources (e.g., associated with a Type 1 configured grant (CG) or a Type 2 CG) including Tx resources 603 and Tx resources 608. The configured resources, in some aspects, may include one or more of ReTx resources 605, ReTx resources 606, or ReTx resources 609. The granted resources, in some aspects, may be repeated based on a period 630. As illustrated, the resources for a particular UE may primarily be associated with a first component carrier (CC) 620.

During the CCI mode of operation 503, the base station 502 may identify and/or detect, at 512, overlapping UL grants (e.g., associated with Tx resource 603 of FIG. 6) for at least a first UL communication and a second UL communications associated with the UE 506 (e.g., a first wireless device) and the UE 504 (e.g., a second wireless device), respectively. In some aspects, an additional conflict with an additional communication associated with UE 505 may be identified at 512. The identification at 512, in some aspects, may further include an identification and/or selection of a set of UEs associated with UL transmissions to be canceled. For example, the base station 502 may select one or more UEs from a set of UEs based on one or more of: (1) a set of experienced delays measured by the set of UEs (e.g., a set of most-recently reported experienced delays), (2) a set of UL channel quality characteristics (e.g., SNR, SINR, CQI, etc.), (3) a number of UEs using the same and/or overlapping resources (e.g., time, frequency, or spatial direction resources) for UL (e.g., for a scheduled UL transmission or a configured grant for UL), an importance, priority, and/or PDB (or remaining PDB) associated with UL transmissions associated with the set of UEs (if known at the base station 502), or other considerations. Specifically, the identification and/or selection of a particular UE (the UE 504) associated with a second UL communication may be based on one or more of: a first set of reported delay statistics associated with the first UL communication, a second set of reported delay statistics associated with the second UL communication, a first traffic-type associated with the first UL communication, a second traffic-type associated with the second UL communication, a first priority associated with the first UL communication, a second priority associated with the second UL communication, a first measured or predicted SINR associated with the first UL communication, a second measured or predicted SINR associated with the second UL communication, a first reported or predicted power information associated with the first UL communication, or a second reported or predicted power information associated with the second UL communication.

As illustrated in call flow diagram 500, the base station 502 may identify and/or detect, at 512, conflicting UL grants and/or resources associated with at least the UE 504, the UE 505, and the UE 506. In some aspects, identifying and/or detecting the conflict at 512 may further be based on a determination that the conflicting UL grants may cause a particular UL transmission via one of the UL grants to be likely to not be received properly and/or to not be received within a remaining PDB of the particular UL transmission. Based on identifying and/or detecting the conflicting grants at 512, the base station 502 may further identify and/or select, at 512, the UE 504 and the UE 505 to be included in a set of UEs associated with UL transmissions to be canceled. For example, if the base station 502 knows that a first communication associated with an URLLC (or other high-priority and/or highly delay-sensitive) service is scheduled via the (conflicting) UL grant associated with the UE 506, the base station 502 may determine to cancel potential UL transmissions via the conflicting grants associated with the UE 504 and the UE 505. The determination based on the first communication being associated with an URLLC service, in some aspects, may further be based on not knowing whether a UL transmission is scheduled via a conflicting grant or knowing that a UL transmission scheduled via a conflicting grant is associated with a type of communication with lower priority and/or less sensitivity to delay (e.g., eMBB, XR, etc.). In some aspects, the UE 504 and/or UE 505 may further be selected by the base station 502, at 512, based on a high channel quality (as measured at the base station 502 based on one or more SRS transmitted from the UE 504 or the UE 505) or low packet delay (e.g., in a latest reported BSR or DSR) indicating that a retransmission is likely to be successful, or any of the other considerations discussed above.

Based on the identification and/or selection at 512, the base station 502 may transmit, and the UE 504 may receive, a first CCI 514 (e.g., CCI 601 of FIG. 6). The base station 502 may also transmit, and UE 506 may receive, a second CCI 516. In some aspects, the CCI 514 (or the CCI 516) may be transmitted and/or received via L1 signaling. As discussed above, the CCI format and contents may be configured in any of a number of ways.

For example, a first, second, and third implementation for a CCI may include a base station and UE operating in a CCI mode (e.g., CCI mode of operation 503) that may be activated or deactivated (e.g., to transition to a CI mode (e.g., CI mode of operation 501)) via L3, L2, or L1 signaling such as RRC signaling, a MAC-CE, scheduling DCI, or non-scheduling DCI as described above. In both the first and second implementations, the base station (and UE) may use an existing signaling format for ULCI, e.g., DCI format 2_4, that is interpreted as indicating a non-conditional cancelation when operating in the CI mode, and as indicating a conditional cancelation (e.g., a CCI) while operating in the CCI mode. In the first implementation, the set of conditions and/or criteria for a conditional cancelation received while operating in the CCI mode may be specified in a configuration and/or activation message received before the CCI (e.g., via L3, L2, or L1 signaling such as RRC signaling, a MAC-CE, scheduling DCI, or non-scheduling DCI as described above). In the second implementation, the set of conditions and/or criteria for a conditional cancelation received while operating in the CCI mode may be specified in a set of reserved bits of the existing signaling format for ULCI. The third implementation, in some aspects, may include using a CCI-specific signaling format (e.g., an eDCI 2_4 or other CCI signaling format) when operating in the CCI mode and the existing ULCI signaling format when operating in the CI mode. In the third implementation, the set of conditions and/or criteria may, in some aspects, be included in defined fields of the CCI-specific signaling format or may be configured by a configuration and/or activation message received before the CCI (e.g., via L3, L2, or L1 signaling such as RRC signaling, a MAC-CE, scheduling DCI, or non-scheduling DCI as described above). For example, in association with the third implementation, a configuration and/or activation message received before the CCI may configure a default set of conditions and/or criteria and, in some aspects, a CCI-specific signaling format may include fields that may be used to override the default set of conditions and/or criteria (e.g., replace a threshold value associated with one or more conditions and/or criteria) or may be left blank to use the default set of conditions and/or criteria. In any of the first, second, or third, implementations, a same RNTI (e.g., a CI-RNTI) may be used for the ULCI used during a CI mode of operation or a CCI used during the CCI mode of operation as only one type of cancelation indication is used at a particular time. Alternatively, a CI-RNTI may be used for the ULCI during the CI mode while a CCI-RNTI may be used for a CCI during the CCI mode. For implementations allowing a non-conditional CI (e.g., ULCI) and a CCI in a same time period, the different types of cancelation indications may be differentiated by using a different RNTI as described above (e.g., when using either a same, or different, format for non-conditional CI and CCI) or based on a different location (e.g., in time and frequency) or format of the cancelation indication.

The CCI 514 (or the CCI 516), in some aspects, may indicate a set of time and frequency resources (e.g., PRB(s) and OFDM symbol(s)) associated with the conditional cancelation (e.g., as provided in DCI format 2_4). The CCI 514 (and the CCI 516) may indicate a set of conditions and/or criteria (e.g., threshold$_1$ 655, threshold$_2$ 665, and/or threshold$_3$ 675) that may include, or be related to one or more of: (1) a packet delay experienced at the UE 506 associated with the first UL communication, (2) a time from an initial transmission of the first UL communication, (3) a PDB associated with the first UL communication, (4) a remaining PDB associated with the first UL communication, or (5) an energy and/or power parameter. The indicated set of conditions and/or criteria, in some aspects, may be a previously configured set of conditions and/or criteria (via previous L3, L2, or L1 signaling) applicable to CCIs generally, where the indication may be related to one or more of a current CCI mode of operation, a CCI-RNTI associated with the CCI, or a CCI-specific signaling format. In some aspects, the indicated set of conditions and/or criteria may be a set of conditions and/or criteria applicable to the received CCI (e.g., CCI 514 or CCI 516) indicated explicitly by bits of the CCI (e.g., reserved bits of a DCI format 2_4 used for a CCI or defined fields in a CCI-specific signaling format such as an eDCI 2_4 or other defined format). In some aspects, at least one condition and/or criteria in the set of conditions and/or criteria is associated with multiple threshold values including at least a first threshold value and a second threshold value (e.g., a pair of threshold selected from threshold$_1$ 655, threshold$_2$ 665, and/or threshold$_3$ 675).

In some aspects, the CCI configuration/activation 510 and/or a CCI 514 (or the CCI 516) may indicate a set of resources for transmitting feedback indicating whether the CCI has been accepted at the UE 504 (or the UE 505) and a delay report (e.g., one of a DSR or a reduced-DSR including less information such as indicating a remaining PDB budget but not other elements of a DSR). For example, referring to FIG. 6, the first resource for transmitting feedback indicating whether the CCI has been accepted at the UE 504, in some aspects, may correspond to resource 602 for transmitting one of a 0/1 indicating acceptance/rejection or vice versa, or a multi-bit (e.g., two- or three-bit) indication of an acceptance or rejection of a cancelation and a basis for the acceptance and/or rejection. The set of resources for transmitting a delay report, in some aspects, may correspond to DSR resources 604 or DSR resources 607. The CCI 514 (or the CCI 516), in some aspects, may further indicate a set of alternate resources (e.g., in a same CC (first CC 620), such as ReTx resources 605 if not part of a CG, or in a different CC (second CC 640) such as additional Tx resource 641) for a canceled UL transmission. The set of conditions and/or criteria, in some aspects, may be used to determine whether to transmit the feedback, the content of the feedback, whether to transmit the delay report, and whether to use the set of alternate resources (e.g., or an existing retransmission occasion or other resource (e.g., ReTx resources 605, ReTx resources 606, Tx resources 608, or ReTx resources 609) associated with an RRC configured (e.g., Type 1 CG) or DCI-configured (e.g., Type 2 CG) periodic, semi-persistent scheduling, or aperiodic resource) for transmitting the canceled UL transmission. For example, the set of conditions and/or criteria may include first and second threshold values (e.g., threshold$_1$ 655 (or threshold$_2$ 665) and threshold$_3$ 675 associated with a remaining PDB of the UL transmission to be canceled) where one of the first and second threshold values may be used by a UE to determine whether to accept or reject the cancelation and the other threshold value (or both threshold values) may be used by the UE to determine whether to transmit feedback to a base station and/or the content and/or nature of the feedback.

Based on the CCI 514, the UE 504 may determine, at 518, to not cancel the second UL communication. The determination at 518, in some aspects, may be based on the set of conditions and/or criteria indicated in one of the CCI configuration/activation 510 or the CCI 514. In some aspects, the determination at 518 may further be based on characteristics of the UE 504 and/or a UL transmission and/or communication to be canceled. For example, the characteristics of the UE 504 may include a packet delay experienced at the wireless device, a charging rate profile of the wireless device, a discharging rate profile of the wireless device, or an energy level profile of the wireless device, where a profile, in some aspects, may include a current value associated with a current time and one or more predicted values associated with a corresponding one or more future times. In some aspects, the characteristics of the UL transmission and/or communication may include a time from an initial transmission of the UL transmission and/or communication, a remaining PDB associated with the UL transmission and/or communication, whether alternative transmission resources (e.g., retransmission occasions and/or resources or an alternate resource indicated in a CCI) are available to transmit the UL transmission and/or communication, and/or a channel quality (e.g., a SNR, a SINR, a CQI, etc.) associated with the UL transmission and/or communication. In some aspects, the channel quality associated with the UL transmission and/or communication may be one of a last-measured (e.g., current) channel quality or a predicted channel quality.

Generally, the UE 504 may, in some aspects, determine not to cancel the second UL communication at 518 based on a determination that the second UL communication may not be able to be transmitted before an expiration of the second UL communication (e.g., before a PDB for the second UL communication has been exceeded). For example, the set of conditions may include a threshold value (e.g., threshold$_1$ 655, threshold$_2$ 665, and/or threshold$_3$ 675) based on a PDB or remaining PDB of the first communication and based on a comparison with a remaining PDB (a time before an end of a PDB illustrated as, e.g., end PDB$_1$ 650) of the second UL communication indicated for cancelation, the UE 504 may determine not to cancel the second UL communication at 518. In some aspects, the remaining PDB of the second UL communication indicated for cancelation may be considered in light of one or more other characteristics of the UE 504, a connection (or channel) quality between the UE 504 and the base station 502, a set of additional configured resources, or the second UL communication that may affect whether the second UL communication may be likely to be transmitted before the remaining PDB has elapsed. For example, if the threshold value (e.g., threshold$_1$ 665) is 4 ms and the remaining PDB of the second UL communication indicated for cancelation is 2 ms (e.g., ending at end PDB$_1$ 650), the UE 504 may determine not to cancel the second UL communication based on one or more of a packet delay experienced at the UE 504, a set of configured (e.g., previously configured or configured in CCI 514) UL resources for (re)transmission of the second UL communication, or a power/energy profile at the UE 504 that indicates that it may be likely to not be able to transmit the second UL communication within the remaining PDB (before 2 ms has elapsed). For example, referring to FIG. 6, the UE 504 may determine that no other transmission resource is available before the end of the PDB (e.g., before end PDB$_1$ 650).

In some aspects, the UE 504 may determine not to cancel the second UL communication at 518 based on a set of power (or energy) based conditions and/or criteria that may indicate that the UE 504 may be able to meet a set of power constraints for the second UL communication via the indicated resources for cancelation but may not be able to meet the set of power constraints for a following time up to the end of the PDB. For example, the set of power (or energy) based conditions and/or criteria may be based on a set of determined power constraints and maximum transmission powers. The UE 504, in some aspects, may determine the power constraint (an estimated power for transmitting a particular transmission) based on configured resources (number of RBs) for the second UL communication, a pathloss parameter, and a $P_0$ (target power per RB). For example, a power constraint, in some aspects, may be associated with a threshold power, $P_{threshold}$. The UE 504 may determine the maximum transmission power based on a fixed (e.g., configured or known) value, or based on a dynamic (e.g., current or predicted) energy and/or power state of the UE 504 (e.g., if UE 504 is an energy harvesting wireless device or a 'max-power changing' wireless device). For example, a maximum transmit power at a particular time, $t_i$, in some aspects, may be associated with a transmit power level (or maximum transmission power), $MaxP_i$, and may be determined for a set of future times (e.g., for each possible transmission occasion until the end of a PDB for a UL communication/transmission that is conditionally canceled by a CCI).

If the UE 504, for example, determines that a $MaxP_0$ (e.g., a determined (dynamic) maximum transmission power) associated with transmitting the second UL communication via the resources indicated in the CCI 514 is less than a determined power constraint (e.g., $P_{threshold}$) by a first amount (e.g., $\Delta P_0 = P_{threshold} - MaxP_0$) while a $MaxP_i$ for $i \in (1,n)$ for n additional possible transmission occasions, or available resources, before the end of a PDB of the second UL communication are less than the determined power constraint ($P_{threshold}$) by a second amount (e.g., $\Delta P_i = P_{threshold} - MaxP_i$) that are each larger than the first amount (e.g., $\Delta P_i > \Delta P_0$ for all i), the UE 504 may determine not to cancel the second UL communication based on the CCI 514. In some aspects, the determination may further be based on a comparison of the difference between the determined power constraint and the maximum transmission power (e.g., $\Delta P_i = P_{threshold} - MaxP_i$) and a threshold power difference (e.g., a maximum allowable power difference power, $\Delta P_{threshold}$) such that the second UL communication may be transmitted if the difference is less than the threshold power difference (e.g., if $\Delta P_i < \Delta P_{threshold}$). The set of power (or energy) based conditions and/or criteria (e.g., $\Delta P_{threshold}$), in some aspects, may be configured in one of L3, L2, or L1 signaling for configuring the CCI mode of operation or configured and/or updated via a CCI (e.g., in reserved bits of a CCI using a DCI format 2_4 or in specific fields of a CCI-specific signaling format such as an eDCI 2_4). The UE 504, in some aspects, may determine the power constraints based on configured resources (number of RBs) for a UL communication, a pathloss parameter, and a $P_0$ (target power per RB).

The determination not to cancel the UL transmission at 518, in some aspects, may further include a determination not to transmit feedback indicating that the cancelation has been rejected. For example, the UE 504 may determine at 518 to not transmit feedback (e.g., via resource 602 and/or DSR resource 604 or 607) based on a determination that a remaining PDB of the second UL transmission indicated to be canceled is below both a first and second threshold value (e.g., below each of a pair of thresholds selected from threshold$_1$ 655, threshold$_2$ 665, and/or threshold$_3$ 675) indicated by the CCI 514. In some aspects, for a UL transmission that is not canceled, the UE 504 may not transmit a separate feedback indicating that the conditional cancelation has been rejected. The determination not to transmit feedback, in some aspects, may be based on a threshold value included in the set of conditions and/or criteria, e.g., if a remaining PDB is less than the threshold value, the UE 504 may determine that there is not enough time to transmit the feedback indicating that the UE 504 has rejected the conditional cancelation.

After transmitting the CCI 514 (and the CCI 516) the base station 502 may, at 520, monitor for the first communication 522 (e.g., the communication that was the basis for the CCIs 514 and 516), feedback from the set of UEs to which a CCI 514 was transmitted (including UEs 504 and UE 505), for a transmission of a non-canceled UL transmission from the set of UEs, and a transmission of a canceled UL transmission via a set of indicated alternate resources. For example, referring to FIG. 6, the base station 502 may monitor Tx resources 603, resources 602, DSR resources 604 and 607, and additional Tx resource 641. The monitoring may include a monitoring for an indication of a cancelation based on a blind decoding that may be used to determine if a UE in the set of UEs identified and/or selected at 512 has transmitted a UL transmission, where the blind-decoding-based determination may be based on, e.g., DMRS detection or energy detection. Based on monitoring for the above communications and/or transmissions, the base station 502 may receive overlapping UL communications including a first communication 522 and the second communication 524 (the non-canceled UL transmission indicated for cancelation). The reception of the second communication 524, in some aspects, may indicate that the conditional cancelation was not accepted and/or (implicitly) provide information regarding a set of conditions at the UE 504 (e.g., that some combination of an experienced packet delay, a power/energy profile, or channel quality may contribute to a delay for a canceled UL transmission that is above one or more threshold values included in the set of conditions and/or criteria associated with the CCI).

For a subsequent, third communication 534 (e.g., a UL transmission from the UE 506), the base station 502 may identify and/or detect, at 526, conflicting UL grants and/or resources associated with at least the UE 504 and the UE 506. The identification and/or detection at 526 may be based on the same, or similar, considerations as described for the identification and/or determination at 512, but may identify different UEs and/or UL transmissions as being associated with a conflict. Based on identifying and/or detecting the conflicting grants at 526, the base station 502 may further identify and/or select, at 512, the UE 504 to be included in a set of UEs associated with UL transmissions to be canceled as discussed above.

In some aspects, the base station 502 may transmit an update indication 528 indicating (or configuring) an updated set of conditions and/or criteria for CCI. For example, the base station may determine that, for the conflict identified and/or detected at 526, one or more conditions and/or criteria (e.g., a set of threshold values associated with a remaining PDB) may be different than a currently configured one or more conditions and/or criteria and may indicate (or configure) an update to the one or more conditions and/or criteria. The indication and/or configuration, in some aspects, may be transmitted via L3, L2, or L1 signaling and may include updated values for the one or more conditions and/or criteria or an index into a known or configured indexed list.

Based on the identification and/or selection at 526, the base station 502 may transmit, and the UE 504 may receive, a CCI 530 (corresponding to CCI 601 of FIG. 6). In aspects including an indication of the set of conditions and/or criteria in the CCI (e.g., using reserved bits of a DCI format 2_4 or a fields of a CCI-specific format such as an eDCI format 2_4), the updated one or more conditions and/or criteria may be indicated and/or included in the CCI 530 and the update indication 528 may be omitted. As discussed above, in some aspects, the CCI 530 may be transmitted and/or received via L1 signaling. As discussed above, the CCI format and contents may be configured in any of a number of ways, but, in some aspects, the CCI format associated with CCI 514 may be assumed to be the same as the CCI format associated with CCI 530.

Based on the CCI 530, the UE 504 may determine, at 532, to cancel a fourth UL communication indicated for cancelation in the CCI 530. The determination at 532, in some aspects, may be based on the set of conditions and/or criteria indicated in one of the update indication 528 or the CCI 530 (e.g., one or more of threshold$_1$ 655, threshold$_2$ 665, and/or threshold$_3$ 675). In some aspects, the determination at 532 may further be based on characteristics of the UE 504 and/or the fourth UL communication (or transmission) to be canceled as discussed above in relation to the determination to not cancel the second UL transmission at 518. For example, referring to FIG. 6, the determination may be made based on an end of the PDB associated with the fourth UL communication being one of end PDB$_2$ 660, end PDB$_3$ 670, or end PDB$_4$ 680 that are preceded by at least one alternate transmission resource, e.g., at least one of additional Tx resource 641, ReTx resources 605, ReTx resources 606, and/or Tx resources 608.

Generally, the UE 504 may, in some aspects, determine to cancel the fourth UL transmission at 532 based on a determination that the UL transmission may be able to be transmitted before an expiration of the UL transmission (e.g., before a PDB for the UL transmission has been exceeded). For example, the set of conditions may include a threshold value based on a PDB or remaining PDB of the first communication and based on a comparison with a remaining PDB of the UL transmission (or communication) indicated for cancelation, the UE 504 may determine to cancel the fourth UL transmission at 532. As discussed above, in some aspects, the remaining PDB of the UL transmission indicated for cancelation may be considered in light of one or more other characteristics of the UE 504, a connection (or channel) quality between the UE 504 and the base station 502, a set of additional configured resources, or the UL transmission that may affect whether the UL transmission may be likely to be transmitted before the remaining PDB has elapsed. For example, if the threshold value is 4 ms and the remaining PDB of the UL transmission indicated for cancelation is 8 ms, the UE 504 may determine to cancel the UL transmission based on one or more of a packet delay experienced at the UE 504, a set of configured (e.g., previously configured or configured in CCI 530) UL resources for (re)transmission of the UL transmission, or a power/energy profile at the UE 504 that indicates that it may be likely to be able to transmit the fourth UL transmission within the remaining PDB (before 8 ms has elapsed).

In some aspects, the UE 504 may determine to cancel the fourth UL communication at 532 based on a set of power (or energy) based conditions and/or criteria as described above in relation to the determination at 518. The set of power (or energy) based conditions and/or criteria may indicate that the UE 504 may not be able to meet a set of power constraints for the fourth UL communication via the indicated resources for cancelation but may be able to meet the set of power constraints for at least one set of available resources before the end of the PDB. For example, the set of power (or energy) based conditions and/or criteria may be based on a set of determined power constraints and maximum transmission powers. The UE 504, in some aspects, may determine the power constraint (an estimated power for transmitting a particular transmission) based on configured resources (number of RBs) for the fourth UL communication, a pathloss parameter, and a P$_0$ (target power per RB). The UE 504 may determine the maximum transmission power based on a fixed (e.g., configured or known) value, or based on a dynamic (e.g., current or predicted) energy and/or power state of the UE 504 (e.g., if UE 504 is an energy harvesting wireless device or a 'max-power changing' wireless device). If the UE 504 determines that a determined (dynamic) maximum power associated with transmitting the fourth UL transmission via the resources indicated in the CCI 530 is less than a determined power constraint by a first amount while a determined maximum power associated with transmitting the fourth UL communication via at least one set of remaining available resources before the expiration of the PDB is less than the determined power constraint by a second amount that is smaller than the first amount, the UE 504 may determine to cancel the fourth UL communication based on the CCI 530. The set of power (or energy) based conditions and/or criteria, in some aspects, may be configured in one of L3, L2, or L1 signaling for configuring the CCI mode of operation or configured and/or updated via a CCI (e.g., in reserved bits of a CCI using a DCI format 2_4 or in specific fields of a CCI-specific signaling format such as an eDCI 2_4). The UE 504, in some aspects, may determine the power constraints based on configured resources (number of RBs) for a UL communication, a pathloss parameter, and a P$_0$ (target power per RB).

The determination to cancel the UL transmission at 532, in some aspects, may further include a determination of subsequent behavior including feedback transmission and identifying resources for a subsequent transmission of the canceled fourth UL communication. The determination of the subsequent behavior related to feedback transmission, in some aspects, may include a determination to transmit feedback 538 indicating one or more of: (1) that the cancelation has been accepted (e.g., corresponding to a single-bit format for resource 602), (2) a basis for the acceptance (or a rejection) of the CCI 530 (e.g., corresponding to a multi-bit format for resource 602), and/or (3) additional feedback relating to characteristics of the UE 504 (e.g., corresponding to one of DSR resources 604 or DSR resources 607), where feedback 538 may include one or more separate feedback transmissions. For example, the feedback 538 indicating that the cancelation has been accepted may be a single bit taking a first value indicating acceptance (where a second value of the bit indicates rejection). The additional feedback included in feedback 538, in some aspects, may include a set of bits configured to indicate a basis for the acceptance (or rejection) of the CCI 530 (e.g., a set of two bits indicating that (1) a remaining PDB is below a first and second threshold value included in the CCI 530, (2) a remaining PDB is between the first and second threshold values, (3) or the remaining PDB is above both the first and second threshold values).

The set of bits configured to indicate the basis for an acceptance, in some aspects, may be transmitted instead of the indication of the acceptance and/or rejection of the CCI. The set of bits configured to indicate the basis for an acceptance, in some aspects, may further indicate additional behavior of the UE 504 such as whether the additional feedback relating to characteristics of the UE 504 may be transmitted and the content of transmitted feedback. As an example of the set of bits replacing an indication of acceptance/rejection of a CCI and indicating additional behavior of the UE 504, the acceptance and/or rejection of the CCI at the UE and the additional behavior may both be determined by a comparison of a third value associated with a characteristic of the UE 504 (or the fourth UL communication indicated to be canceled) to the first and second threshold values. For example, the third value being (1) below both threshold values (e.g., end $PDB_1$ 650 being below both of a pair of threshold values selected from $threshold_1$ 655, $threshold_2$ 665, and/or $threshold_3$ 675), (2) between the first and second threshold values (e.g., end $PDB_2$ 660 being between a pair of threshold values $threshold_1$ 655 and $threshold_2$ 665), or (3) being above both threshold values (e.g., end $PDB_4$ 680 being above a pair of threshold values $threshold_1$ 655 and $threshold_2$ 665) may be associated with (i) rejecting the CCI and not transmitting feedback, (ii) accepting (or rejecting) the CCI and transmitting a first feedback (e.g., a limited feedback such as reporting a remaining PDB and/or feedback via a first set of resources such as DSR resources 604), or (iii) accepting the CCI and transmitting a second feedback (e.g., a more comprehensive feedback such as a DSR (and/or a BSR) and/or feedback via a second set of resources such as DSR resources 607), where condition (1) may be associated with one of behavior (i) or (iii) (and condition (3) may be associated with one of behavior (iii) or (i)) depending on the nature of the threshold values and characteristic value.

In some aspects, the additional feedback relating to characteristics of the UE 504 may include a DSR and/or BSR and may be conditionally transmitted. In some aspects, the conditions for transmitting the additional feedback may relate to one or more conditions and/or criteria in the set of conditions and/or criteria (e.g., the condition for transmitting the feedback may relate to thresholds in the set of conditions and/or criteria as discussed above). The feedback transmission, in some aspects, may alternatively, or additionally, be based on whether the CCI is accepted or rejected. In some aspects, feedback may be transmitted in response to each CCI to update a set of parameters used in relation to the identifications, determinations, and/or selections made at 512 and 526 as discussed above. If feedback is transmitted, the content or timing may be based on the set of conditions and/or criteria and/or whether the CCI was accepted or rejected.

The determination of the subsequent behavior at 532 may further include a determination of a set of resources for transmitting the fourth communication 540. The base station 502 may receive, and UE 506 may transmit, third communication 534 (but not the canceled and/or rescheduled fourth communication from the UE 504). The base station 502 may, at 536, monitor for (and receive) feedback 538 and fourth communication 540. The monitoring at 536, in some aspects, may be based on feedback resources and/or alternate resources indicated by the CCI (or included in a configured grant) for transmitting a canceled UL communication. As described above, the feedback 538 may include one or more feedback transmissions including one or more different types of feedback including whether the CCI was accepted or rejected, a basis for the acceptance or rejection, and/or a set of characteristics of the UE 504 (e.g., included in a DSR or BSR).

Figure 7:
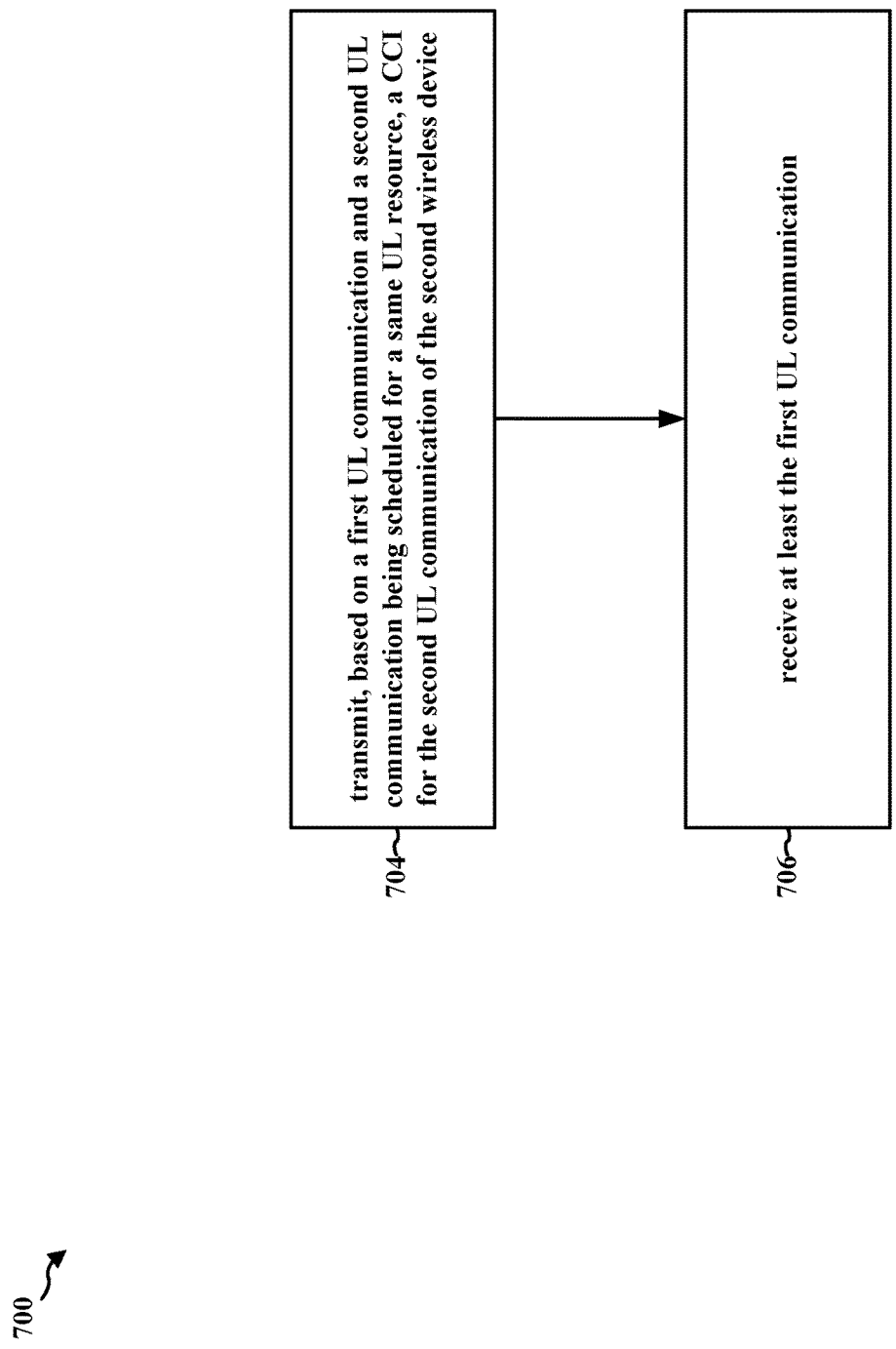
FIG. 7 is a flowchart of a method of wireless communication.

FIG. 7 is a flowchart 700 of a method of wireless communication. The method may be performed by a network node such as a base station (e.g., the base station 102, 402, or 502; the network entity 1102 or 1202). In some aspects, the network node may indicate for a second wireless device to interpret control information as a CCI. The indication, in some aspect, may be via at least one of an RRC message, a MAC-CE, or DCI. In some aspects, the indication may include a set of criteria for the second wireless device to determine whether to cancel an indicated UL communication based on a CCI. For example, referring to FIG. 5, the base station 502 may transmit CCI configuration/activation 510 (including the set of conditions and/or criteria for canceling a UL communication) to at least UE 504 to indicate for the UE 504 to transition to a CCI mode of operation 503.

At 704, the network node may transmit, based on a first UL communication associated with a first wireless device and a second UL communication associated with the second wireless device being scheduled for a same UL resource, a CCI for the second UL communication of the second wireless device. For example, 704 may be performed by CU processor 1212, DU processor 1232, RU processor 1242, transceiver(s) 1246, antenna(s) 1280, and/or ULCCI component 199 of FIG. 12. In some aspects, the CCI may be transmitted based on one or more of: a first set of reported delay statistics associated with the first UL communication, a second set of reported delay statistics associated with the second UL communication, a first traffic-type associated with the first UL communication, a second traffic-type associated with the second UL communication, a first priority associated with the first UL communication, a second priority associated with the second UL communication, a first measured or predicted SINR associated with the first UL communication, a second measured or predicted SINR associated with the second UL communication, a first reported or predicted power information associated with the first UL communication, or a second reported or predicted power information associated with the second UL communication. In some aspects, at least one of the first reported or predicted power information associated with the first UL communication or the second reported or predicted power information associated with the second UL communication includes one or more of: a charging rate profile, a discharging rate profile, or an energy level profile, where a profile includes a current value associated with a current time and one or more predicted values associated with a corresponding one or more future times. For example, referring to FIG. 5, the base station 502 may identify and/or detect, at 512, overlapping UL grants and identify and/or select the UE 504 (corresponding to the second wireless device) associated with a second UL communication to be conditionally canceled.

In some aspects, the CCI is included in an additional DCI (beyond a DCI used to activate the CCI capability or mode of operation). In some aspects, the additional DCI may be indicated to be a CCI (e.g., to be interpreted at the second wireless device as a CCI) as being a CCI instead of a non-conditional CI based on at least one of the indication transmitted at 702 (e.g., the RRC message, the MAC-CE, the DCI), a format of the CCI being different from a format associated with the non-conditional CI, or a first RNTI associated with the additional DCI being different from a second RNTI associated with a DCI comprising a non-conditional CI. The additional DCI (e.g., the CCI), in some aspects, may include a set of criteria for the second wireless device to determine whether to cancel the second UL communication based on the CCI. Alternatively, or additionally, the additional DCI (e.g., the CCI) may indicate the set of criteria by reference to the set of criteria configured by the indication transmitted at 702. In some aspects, the set of criteria relate to one or more of: a packet delay experienced at the first wireless device associated with the first UL communication, a time from an initial transmission of the first UL communication, a PDB associated with the first UL communication, a remaining PDB associated with the first UL communication, a power parameter, or an energy parameter. At least one criteria in the set of criteria, in some aspects, may be associated with multiple threshold values including at least a first threshold value and a second threshold value. In some aspects, the CCI further indicates at least one alternate UL resource for transmission of the second UL communication. For example, referring to FIG. 5, the base station 502 may transmit, and the UE 504 may receive, CCI 514 based on the identification/detection/selection at 512.

At 706, the network node may receive at least the first (uncanceled) UL communication. For example, 706 may be performed by CU processor 1212, DU processor 1232, RU processor 1242, transceiver(s) 1246, antenna(s) 1280, and/or ULCCI component 199 of FIG. 12. Referring to FIG. 5, for example, the base station 502 may receive the first communication 522.

In some aspects, the network node may receive a first indication that the CCI for the second UL communication has been one of accepted or rejected. Referring to FIG. 5, for example, the base station 502 may receive the second communication 524 indicating that the CCI was rejected or may receive feedback 538 indicating that the cancelation was accepted (or similar feedback indicating the CCI was rejected).

In some aspects in which a specific feedback indicating a rejection of the CCI is received, the network node may receive the second UL communication (via the resources that were identified in the CCI). Referring to FIGS. 5 and 6, for example, the base station 502 may, at 520, monitor for a transmission of a non-canceled UL transmission from the set of UEs and receive (non-canceled and/or non-rescheduled) second communication 524. If the cancelation was accepted, the network node may monitor a subsequent UL resource associated with the second wireless device associated with the second UL communication. Referring to FIGS. 5 and 6, for example, the base station 502 may monitor, at 536, subsequent UL resources (one or more of Tx resources 603, DSR resources 604, ReTx resources 605, ReTx resources 606, DSR resources 607, Tx resources 608, and/or ReTx resources 609) for, and receive, one of the rescheduled transmission or additional feedback from the UE 504.

Figure 8:
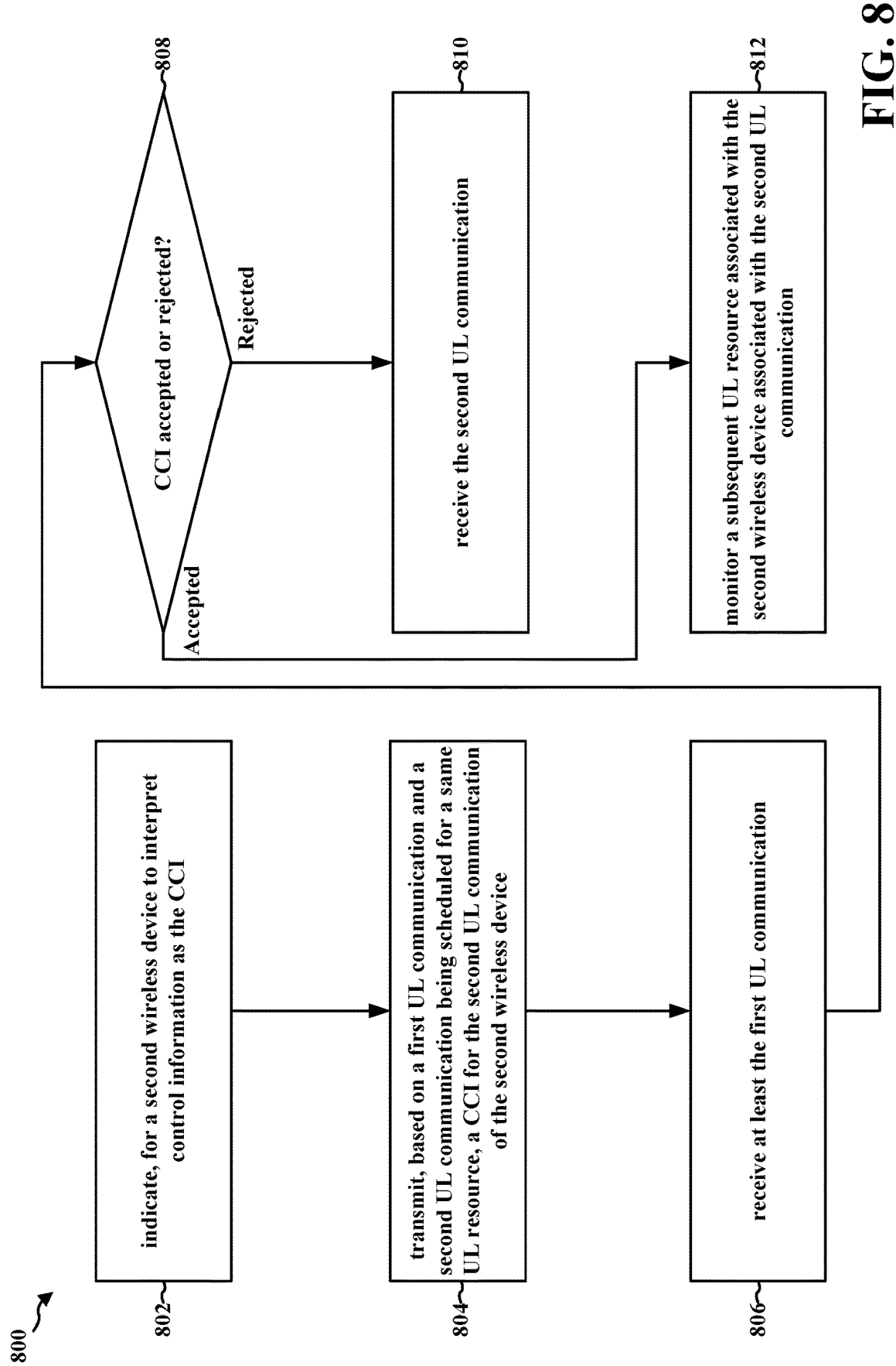
FIG. 8 is a flowchart of a method of wireless communication.

FIG. 8 is a flowchart 800 of a method of wireless communication. The method may be performed by a network node such as a base station (e.g., the base station 102, 402, or 502; the network entity 1102 or 1202). At 802, the network node may indicate for a second wireless device to interpret control information as a CCI. For example, 802 may be performed by CU processor 1212, DU processor 1232, RU processor 1242, transceiver(s) 1246, antenna(s) 1280, and/or ULCCI component 199 of FIG. 12. The indication, in some aspect, may be via at least one of an RRC message, a MAC-CE, or DCI. In some aspects, the indication may include a set of criteria for the second wireless device to determine whether to cancel an indicated UL communication based on a CCI. For example, referring to FIG. 5, the base station 502 may transmit CCI configuration/activation 510 (including the set of conditions and/or criteria for canceling a UL communication) to at least UE 504 to indicate for the UE 504 to transition to a CCI mode of operation 503.

At 804, the network node may transmit, based on a first UL communication associated with a first wireless device and a second UL communication associated with the second wireless device being scheduled for a same UL resource, a CCI for the second UL communication of the second wireless device. For example, 804 may be performed by CU processor 1212, DU processor 1232, RU processor 1242, transceiver(s) 1246, antenna(s) 1280, and/or ULCCI component 199 of FIG. 12. In some aspects, the CCI may be transmitted based on one or more of: a first set of reported delay statistics associated with the first UL communication, a second set of reported delay statistics associated with the second UL communication, a first traffic-type associated with the first UL communication, a second traffic-type associated with the second UL communication, a first priority associated with the first UL communication, a second priority associated with the second UL communication, a first measured or predicted SINR associated with the first UL communication, a second measured or predicted SINR associated with the second UL communication, a first reported or predicted power information associated with the first UL communication, or a second reported or predicted power information associated with the second UL communication. In some aspects, at least one of the first reported or predicted power information associated with the first UL communication or the second reported or predicted power information associated with the second UL communication includes one or more of: a charging rate profile, a discharging rate profile, or an energy level profile, where a profile includes a current value associated with a current time and one or more predicted values associated with a corresponding one or more future times. For example, referring to FIG. 5, the base station 502 may identify and/or detect, at 512, overlapping UL grants and identify and/or select the UE 504 (corresponding to the second wireless device) associated with a second UL communication to be conditionally canceled.

In some aspects, the CCI is included in an additional DCI (beyond a DCI used to activate the CCI capability or mode of operation). In some aspects, the additional DCI may be indicated to be a CCI (e.g., to be interpreted at the second wireless device as a CCI) as being a CCI instead of a non-conditional CI based on at least one of the indication transmitted at 802 (e.g., the RRC message, the MAC-CE, the DCI), a format of the CCI being different from a format associated with the non-conditional CI, or a first RNTI associated with the additional DCI being different from a second RNTI associated with a DCI comprising a non-conditional CI. The additional DCI (e.g., the CCI), in some aspects, may include a set of criteria for the second wireless device to determine whether to cancel the second UL communication based on the CCI. Alternatively, or additionally, the additional DCI (e.g., the CCI) may indicate the set of criteria by reference to the set of criteria configured by the indication transmitted at 802. In some aspects, the set of criteria relate to one or more of: a packet delay experienced at the first wireless device associated with the first UL communication, a time from an initial transmission of the first UL communication, a PDB associated with the first UL communication, a remaining PDB associated with the first UL communication, a power parameter, or an energy parameter. At least one criteria in the set of criteria, in some aspects, may be associated with multiple threshold values including at least a first threshold value and a second threshold value. In some aspects, the CCI further indicates at least one alternate UL resource for transmission of the second UL communication. For example, referring to FIG. 5, the base station 502 may transmit, and the UE 504 may receive, CCI 514 based on the identification/detection/selection at 512.

At 806, the network node may receive at least the first (uncanceled) UL communication. For example, 806 may be performed by CU processor 1212, DU processor 1232, RU processor 1242, transceiver(s) 1246, antenna(s) 1280, and/or ULCCI component 199 of FIG. 12. Referring to FIG. 5, for example, the base station 502 may receive the first communication 522.

At 808, the network node may receive a first indication that the CCI for the second UL communication has been one of accepted or rejected. For example, 808 may be performed by CU processor 1212, DU processor 1232, RU processor 1242, transceiver(s) 1246, antenna(s) 1280, and/or ULCCI component 199 of FIG. 12.

Referring to FIG. 5, for example, the base station 502 may receive the second communication 524 indicating that the CCI was rejected or may receive feedback 538 indicating that the cancelation was accepted (or similar feedback indicating the CCI was rejected).

In some aspects in which a specific feedback indicating a rejection of the CCI is received at 808, the network node may, at 810, receive the second UL communication (via the resources that were identified in the CCI). For example, 810 may be performed by CU processor 1212, DU processor 1232, RU processor 1242, transceiver(s) 1246, antenna(s) 1280, and/or ULCCI component 199 of FIG. 12. Referring to FIGS. 5 and 6, for example, the base station 502 may, at 520, monitor for a transmission of a non-canceled UL transmission from the set of UEs and receive (non-canceled and/or non-rescheduled) second communication 524.

If the cancelation was accepted at 808, the network node may, at 812, monitor a subsequent UL resource associated with the second wireless device associated with the second UL communication. For example, 812 may be performed by CU processor 1212, DU processor 1232, RU processor 1242, transceiver(s) 1246, antenna(s) 1280, and/or ULCCI component 199 of FIG. 12. Referring to FIGS. 5 and 6, for example, the base station 502 may monitor, at 536, subsequent UL resources (one or more of Tx resources 603, DSR resources 604, ReTx resources 605, ReTx resources 606, DSR resources 607, Tx resources 608, and/or ReTx resources 609) for, and receive, one of the rescheduled transmission or additional feedback from the UE 504.

Figure 9:
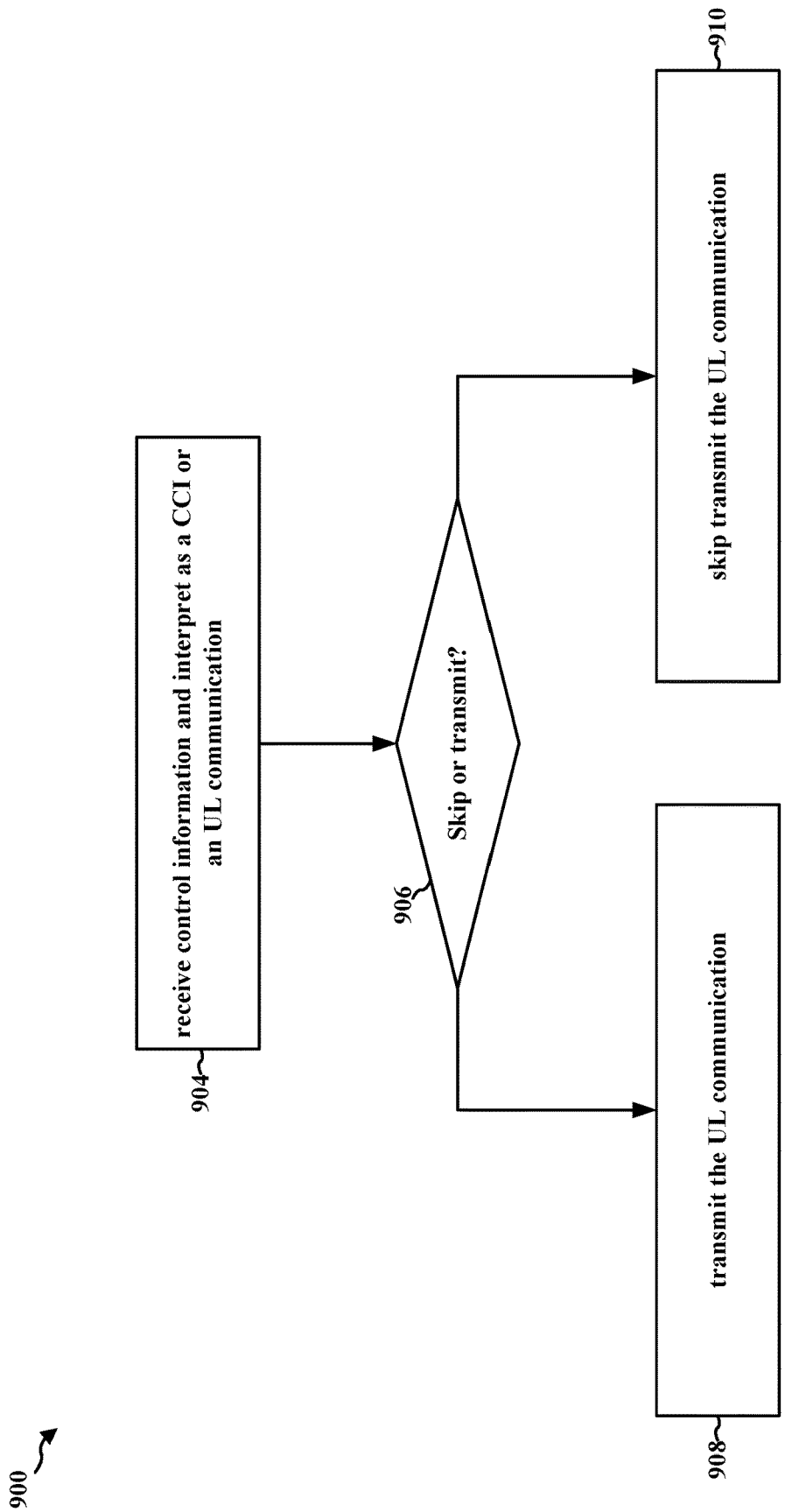
FIG. 9 is a flowchart of a method of wireless communication.

FIG. 9 is a flowchart 900 of a method of wireless communication. The method may be performed by a wireless device such as a UE (e.g., the UE 104, 404, 504, 505, or 506; the apparatus 1104). In some aspects, the wireless device may receive an indication for a second wireless device to interpret control information as a CCI. The indication, in one aspect, may be received via at least one of an RRC message, a MAC-CE, or DCI. In some aspects, the indication may include a set of criteria for the wireless device to determine whether to cancel an indicated UL communication based on a CCI. For example, referring to FIG. 5, the UE 504 may receive, and base station 502 may transmit, CCI configuration/activation 510 (including the set of conditions and/or criteria for canceling a UL communication) indicating for the UE 504 to transition to a CCI mode of operation 503.

At 904, the wireless device may receive control information and interpret the control information as being a CCI (instead of a non-conditional CI) for an UL communication scheduled via a first UL resource. For example, 904 may be performed by application processor 1106, cellular baseband processor 1124, transceiver(s) 1122, antenna(s) 1180, and/or ULCCI component 198 of FIG. 11.

In some aspects, the CCI is included in an additional DCI (beyond a DCI used to activate the CCI capability or mode of operation). In some aspects, the additional DCI may be interpreted as being a CCI instead of a non-conditional CI based on at least one of the indication received at 902 (e.g., the RRC message, the MAC-CE, the DCI), a format of the CCI being different from a format associated with the non-conditional CI, or a first RNTI associated with the additional DCI being different from a second RNTI associated with a DCI comprising a non-conditional CI. The additional DCI (e.g., the CCI), in some aspects, may include a set of criteria for the second wireless device to determine whether to cancel the second UL communication based on the CCI. Alternatively, or additionally, the additional DCI (e.g., the CCI) may indicate the set of criteria by reference to the set of criteria configured by the indication transmitted at 902. In some aspects, the set of criteria relate to one or more of: a packet delay experienced at an additional wireless device associated with an additional UL communication scheduled for transmission via the first UL resource, a time from an initial transmission of the additional UL communication, a PDB associated with the additional UL communication, a remaining PDB associated with the additional UL communication, a power parameter, or an energy parameter. At least one criteria in the set of criteria, in some aspects, may be associated with multiple threshold values including at least a first threshold value and a second threshold value. In some aspects, the CCI further indicates at least one alternate UL resource for transmission of the second UL communication. For example, referring to FIG. 5, the base station 502 may transmit, and the UE 504 may receive, CCI 514 based on the identification/detection/selection at 512.

At 906, the wireless device may determine whether to skip or transmit the UL communication. The determination at 906 whether to skip or transmit the UL communication by determining if a set of criteria (or condition) for canceling the UL communication have been met. For example, 906 may be performed by application processor 1106, cellular baseband processor 1124, transceiver(s) 1122, antenna(s) 1180, and/or ULCCI component 198 of FIG. 11. The determination at 906, in some aspects, may be based on the set of criteria received in association with one of the indication activating (and/or configuring) the CCI mode of operation or the CCI received at 904 and may further be based on additional information available to the wireless device such as one or more of: a packet delay experienced at the wireless device, a time from an initial transmission of the UL communication, a remaining PDB associated with the UL communication, whether alternative transmission resources are available to transmit the UL communication, a SINR (as an example of a channel quality similar to SNR and CQI) associated with the UL communication, a charging rate profile of the wireless device, a discharging rate profile of the wireless device, or an energy level profile of the wireless device. In some aspects, one or more of the charging rate profile, the discharging rate profile, and/or the energy level profile of the wireless device include a current value associated with a current time and one or more predicted values associated with a corresponding one or more future times. For example, referring to FIGS. 5 and 6, the UE 504 may determine at 518 or 532 whether to cancel a second or fourth UL communication, respectively, based on the criteria associated with CCI 514 and, for example, the availability of alternative resources for transmission (e.g., additional Tx resource 641, ReTx resources 605, ReTx resources 606, Tx resources 608, and/or ReTx resources 609) and an end of an associated PDB (e.g., end $PDB_1$ 650, end $PDB_2$ 660, end $PDB_3$ 670, or end $PDB_4$ 680).

If the wireless device determines to not cancel the UL transmission at 906, the wireless device (e.g., when a condition for cancelation is not met) may, at 908, transmit the UL communication. For example, 908 may be performed by application processor 1106, cellular baseband processor 1124, transceiver(s) 1122, antenna(s) 1180, and/or ULCCI component 198 of FIG. 11. Referring to FIGS. 5 and 6, for example, the UE 504 may transmit, and the base station may receive, (non-canceled and/or non-rescheduled) second communication 524.

If the wireless device determines to cancel the UL transmission at 906, the wireless device (e.g., when a condition for cancelation is met) may, at 910, skip transmitting the UL communication via the first UL resource. For example, 910 may be performed by application processor 1106, cellular baseband processor 1124, transceiver(s) 1122, antenna(s) 1180, and/or ULCCI component 198 of FIG. 11. In some aspects, skipping the transmitting at 910 includes determining a set of alternate resources for a subsequent transmission and transmitting the UL communication via the set of alternate resources. For example, referring to FIGS. 5 and 6, the UE 504 may cancel (skip the originally scheduled fourth transmission) and determine resources for transmitting the (rescheduled) fourth communication 540.

In some aspects, the wireless device may transmit a first indication that the CCI for the UL communication has been one of accepted or rejected. In some aspects, the first indication may be one of a single-bit or multi-bit indication (including some information in addition to whether the CCI was accepted or rejected). For example, referring to FIGS. 5 and 6, the UE 504 may transmit feedback 538 indicating whether the CCI was accepted or rejected (e.g., via a resource 602). In some aspects, the wireless device may determine based on at least one of the first threshold value or the second threshold value and a related value at the wireless device, whether to transmit or omit an additional (feedback/reporting) transmission and a content of the additional transmission. In some aspects, the content of the additional transmission may include one of a first additional indication of a remaining PDB of the UL communication, or a second additional indication of a delay status associated with the wireless device (e.g., a DSR or BSR). For example, referring to FIGS. 5 and 6, the UE 504 may determine at 532 (or 518) whether to transmit feedback 538 (or a component of feedback 538) indicating additional feedback (e.g., an indication of a remaining PDB, a DSR, and/or BSR) relating to characteristics of the UE 504 (e.g., corresponding to one of DSR resources 604 or DSR resources 607).

If the wireless device determines to transmit the additional (feedback/reporting) transmission, the wireless device may transmit the determined feedback. For example, referring to FIGS. 5 and 6, the UE 504 based on the determination at 532 may transmit feedback 538 indicating the additional feedback relating to characteristics of the UE 504 (e.g., corresponding to one of DSR resources 604 or DSR resources 607). If the wireless device determines to omit the additional (feedback/reporting) transmission, the method may end.

Figure 10:
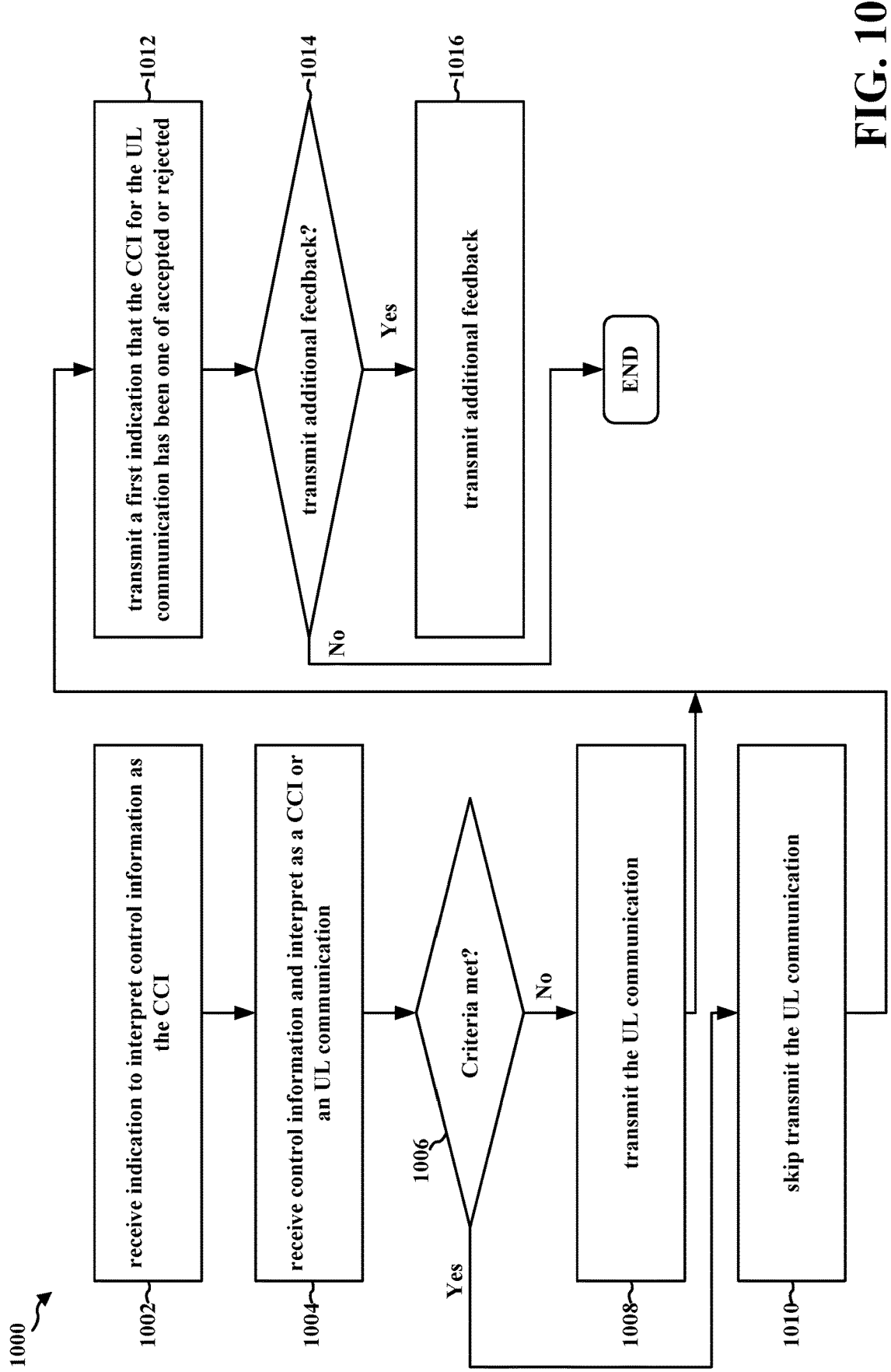
FIG. 10 is a flowchart of a method of wireless communication.

FIG. 10 is a flowchart 1000 of a method of wireless communication. The method may be performed by a wireless device such as a UE (e.g., the UE 104, 404, 504, 505, or 506; the apparatus 1104). At 1002, the wireless device may receive an indication for a second wireless device to interpret control information as a CCI. For example, 1002 may be performed by application processor 1106, cellular baseband processor 1124, transceiver(s) 1122, antenna(s) 1180, and/or ULCCI component 198 of FIG. 11. The indication, in some aspect, may be received via at least one of an RRC message, a MAC-CE, or DCI. In some aspects, the indication may include a set of criteria for the wireless device to determine whether to cancel an indicated UL communication based on a CCI. For example, referring to FIG. 5, the UE 504 may receive, and base station 502 may transmit, CCI configuration/activation 510 (including the set of conditions and/or criteria for canceling a UL communication) indicating for the UE 504 to transition to a CCI mode of operation 503.

At 1004, the wireless device may receive control information and interpret the control information as being a CCI (instead of a non-conditional CI) for an UL communication scheduled via a first UL resource. For example, 1004 may be performed by application processor 1106, cellular baseband processor 1124, transceiver(s) 1122, antenna(s) 1180, and/or ULCCI component 198 of FIG. 11.

In some aspects, the CCI is included in an additional DCI (beyond a DCI used to activate the CCI capability or mode of operation). In some aspects, the additional DCI may be interpreted as being a CCI instead of a non-conditional CI based on at least one of the indication received at 1002 (e.g., the RRC message, the MAC-CE, the DCI), a format of the CCI being different from a format associated with the non-conditional CI, or a first RNTI associated with the additional DCI being different from a second RNTI associated with a DCI comprising a non-conditional CI. The additional DCI (e.g., the CCI), in some aspects, may include a set of criteria for the second wireless device to determine whether to cancel the second UL communication based on the CCI. Alternatively, or additionally, the additional DCI (e.g., the CCI) may indicate the set of criteria by reference to the set of criteria configured by the indication transmitted at 1002. In some aspects, the set of criteria relate to one or more of: a packet delay experienced at an additional wireless device associated with an additional UL communication scheduled for transmission via the first UL resource, a time from an initial transmission of the additional UL communication, a PDB associated with the additional UL communication, a remaining PDB associated with the additional UL communication, a power parameter, or an energy parameter. At least one criteria in the set of criteria, in some aspects, may be associated with multiple threshold values including at least a first threshold value and a second threshold value. In some aspects, the CCI further indicates at least one alternate UL resource for transmission of the second UL communication. For example, referring to FIG. 5, the base station 502 may transmit, and the UE 504 may receive, CCI 514 based on the identification/detection/selection at 512.

At 1006, the wireless device may determine whether to skip or transmit the UL communication. The determination at 1006 whether to skip or transmit the UL communication by determining if a set of criteria for canceling the UL communication have been met. For example, 1006 may be performed by application processor 1106, cellular baseband processor 1124, transceiver(s) 1122, antenna(s) 1180, and/or ULCCI component 198 of FIG. 11. The determination at 1006, in some aspects, may be based on the set of criteria received in association with one of the indication received at 1002 or the CCI received at 1004 and may further be based on additional information available to the wireless device such as one or more of: a packet delay experienced at the wireless device, a time from an initial transmission of the UL communication, a remaining PDB associated with the UL communication, whether alternative transmission resources are available to transmit the UL communication, a SINR (as an example of a channel quality similar to SNR and CQI) associated with the UL communication, a charging rate profile of the wireless device, a discharging rate profile of the wireless device, or an energy level profile of the wireless device. In some aspects, one or more of the charging rate profile, the discharging rate profile, and/or the energy level profile of the wireless device include a current value associated with a current time and one or more predicted values associated with a corresponding one or more future times. For example, referring to FIGS. 5 and 6, the UE 504 may determine at 518 or 532 whether to cancel a second or fourth UL communication, respectively, based on the criteria associated with CCI 514 and, for example, the availability of alternative resources for transmission (e.g., additional Tx resource 641, ReTx resources 605, ReTx resources 606, Tx resources 608, and/or ReTx resources 609) and an end of an associated PDB (e.g., end PDB$_1$ 650, end PDB$_2$ 660, end PDB$_3$ 670, or end PDB$_4$ 680).

If the wireless device determines to not cancel the UL transmission at 1006, the wireless device (e.g., when a condition for cancelation is not met) may, at 1008, transmit the UL communication. For example, 1008 may be performed by application processor 1106, cellular baseband processor 1124, transceiver(s) 1122, antenna(s) 1180, and/or ULCCI component 198 of FIG. 11. Referring to FIGS. 5 and 6, for example, the UE 504 may transmit, and the base station may receive, (non-canceled and/or non-rescheduled) second communication 524.

If the wireless device determines to cancel the UL transmission at 1006, the wireless device (e.g., when a condition for cancelation is met) may, at 1010, skip transmitting the UL communication via the first UL resource. For example, 1010 may be performed by application processor 1106, cellular baseband processor 1124, transceiver(s) 1122, antenna(s) 1180, and/or ULCCI component 198 of FIG. 11. In some aspects, skipping the transmitting at 1010 includes determining a set of alternate resources for a subsequent transmission and transmitting the UL communication via the set of alternate resources. For example, referring to FIGS. 5 and 6, the UE 504 may cancel (skip the originally scheduled fourth transmission) and determine resources for transmitting the (rescheduled) fourth communication 540.

In some aspects, at 1012, the wireless device may transmit a first indication that the CCI for the UL communication has been one of accepted or rejected. For example, 1012 may be performed by application processor 1106, cellular baseband processor 1124, transceiver(s) 1122, antenna(s) 1180, and/or ULCCI component 198 of FIG. 11. In some aspects, the first indication may be one of a single-bit or multi-bit indication (including some information in addition to whether the CCI was accepted or rejected). For example, referring to FIGS. 5 and 6, the UE 504 may transmit feedback 538 indicating whether the CCI was accepted or rejected (e.g., via a resource 602).

At 1014, the wireless device may determine based on at least one of the first threshold value or the second threshold value and a related value at the wireless device, whether to transmit or omit an additional (feedback/reporting) transmission and a content of the additional transmission. For example, 1014 may be performed by application processor 1106, cellular baseband processor 1124, transceiver(s) 1122, antenna(s) 1180, and/or ULCCI component 198 of FIG. 11. In some aspects, the content of the additional transmission may include one of a first additional indication of a remaining PDB of the UL communication, or a second additional indication of a delay status associated with the wireless device (e.g., a DSR or BSR). For example, referring to FIGS. 5 and 6, the UE 504 may determine at 532 (or 518) whether to transmit feedback 538 (or a component of feedback 538) indicating additional feedback (e.g., an indication of a remaining PDB, a DSR, and/or BSR) relating to characteristics of the UE 504 (e.g., corresponding to one of DSR resources 604 or DSR resources 607).

If the wireless device determines at 1014 to transmit the additional (feedback/reporting) transmission, the wireless device, at 1016 may transmit the determined feedback. For example, referring to FIGS. 5 and 6, the UE 504 based on the determination at 532 may transmit feedback 538 indicating the additional feedback relating to characteristics of the UE 504 (e.g., corresponding to one of DSR resources 604 or DSR resources 607). If the wireless device determines to omit the additional (feedback/reporting) transmission, the method may end.

Figure 11:
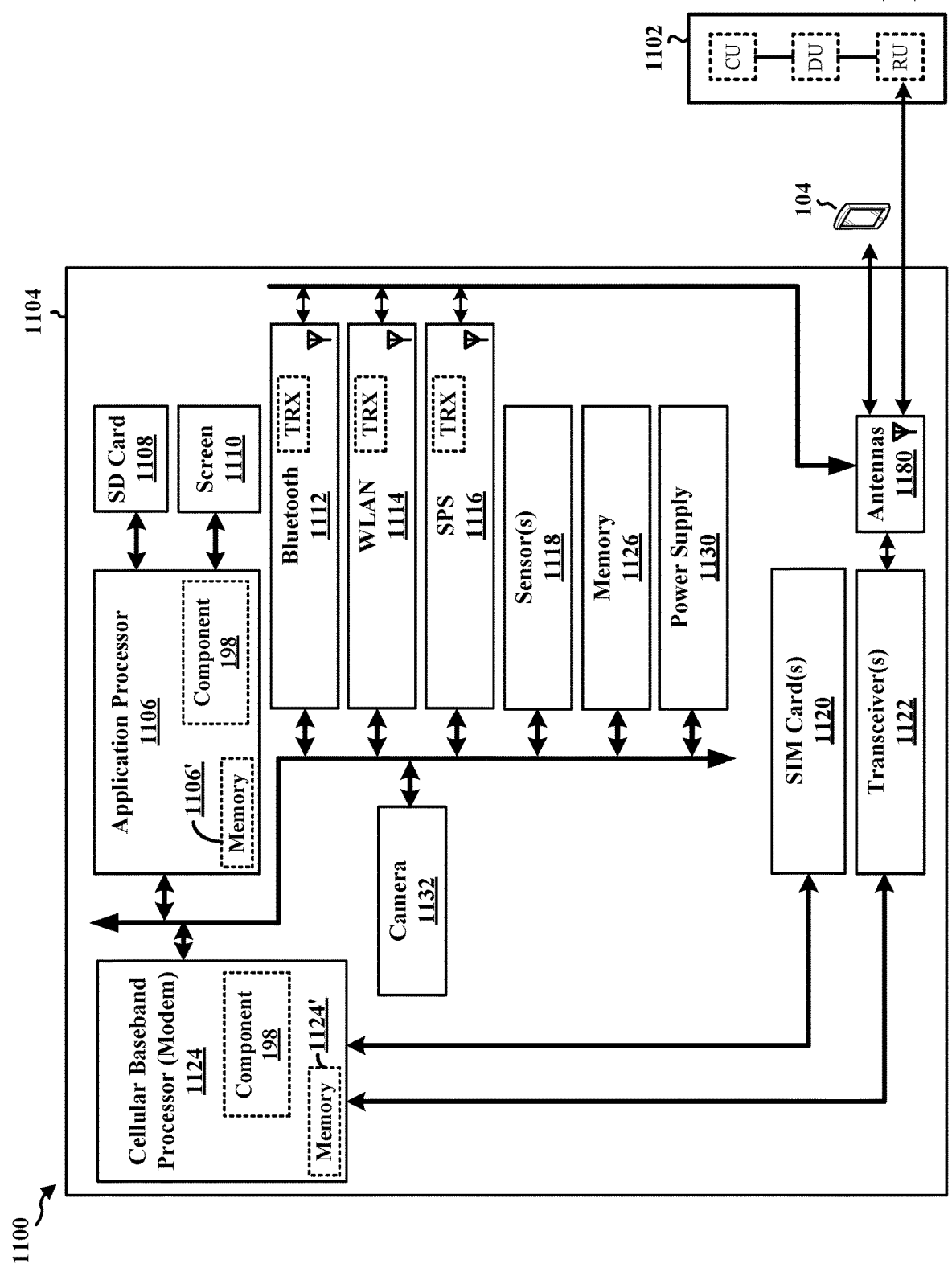
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the ULCCI component 198 may be configured to receive a CCI for an UL communication scheduled via a first UL resource, skip transmitting the UL communication via the first UL resource when a condition is met, and transmit the UL communication via the first UL resource when the condition is not met. The ULCCI component 198 may be within the cellular baseband processor 1124, the application processor 1106, or both the cellular baseband processor 1124 and the application processor 1106. The ULCCI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for receiving a CCI for an UL communication scheduled via a first UL resource. The apparatus 1104, and in particular the cellular baseband processor 1124 and/or the application processor 1106, may include means for skipping transmitting the UL communication via the first UL resource when a condition is met. The apparatus 1104, and in particular the cellular baseband processor 1124 and/or the application processor 1106, may include means for transmitting the UL communication via the first UL resource when the condition is not met. The apparatus 1104, and in particular the cellular baseband processor 1124 and/or the application processor 1106, may include means for determining whether to skip or transmit the UL communication based on one or more of: a packet delay experienced at the wireless device, a time from an initial transmission of the UL communication, a remaining PDB associated with the UL communication, whether alternative transmission resources are available to transmit the UL communication, a SINR associated with the UL communication, a charging rate profile of the wireless device, a discharging rate profile of the wireless device, or an energy level profile of the wireless device. The apparatus 1104, and in particular the cellular baseband processor 1124 and/or the application processor 1106, may include means for transmitting a first indication that the CCI for the UL communication has been one of accepted or rejected. The apparatus 1104, and in particular the cellular baseband processor 1124 and/or the application processor 1106, may include means for determining, based on at least one of the first threshold value or the second threshold value and a related value at the wireless device, whether to transmit or omit an additional transmission and a content of the additional transmission. The apparatus 1104, and in particular the cellular baseband processor 1124 and/or the application processor 1106, may include means for receiving an indication, via at least one of an RRC message, a MAC-CE, or a DCI, to interpret control information as the CCI.

The apparatus 1104, and in particular the cellular baseband processor 1124 and/or the application processor 1106, may include means for interpreting the additional DCI as being a CCI instead of a non-conditional CI based on at least one of: the indication, a format of the CCI being different from a format associated with the non-conditional CI, or a first RNTI associated with the additional DCI being different from a second RNTI associated with a DCI comprising a non-conditional CI. The means may be the ULCCI component 198 of the apparatus 1104 configured to perform the functions recited in relation to FIGS. 9 and 10 or by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
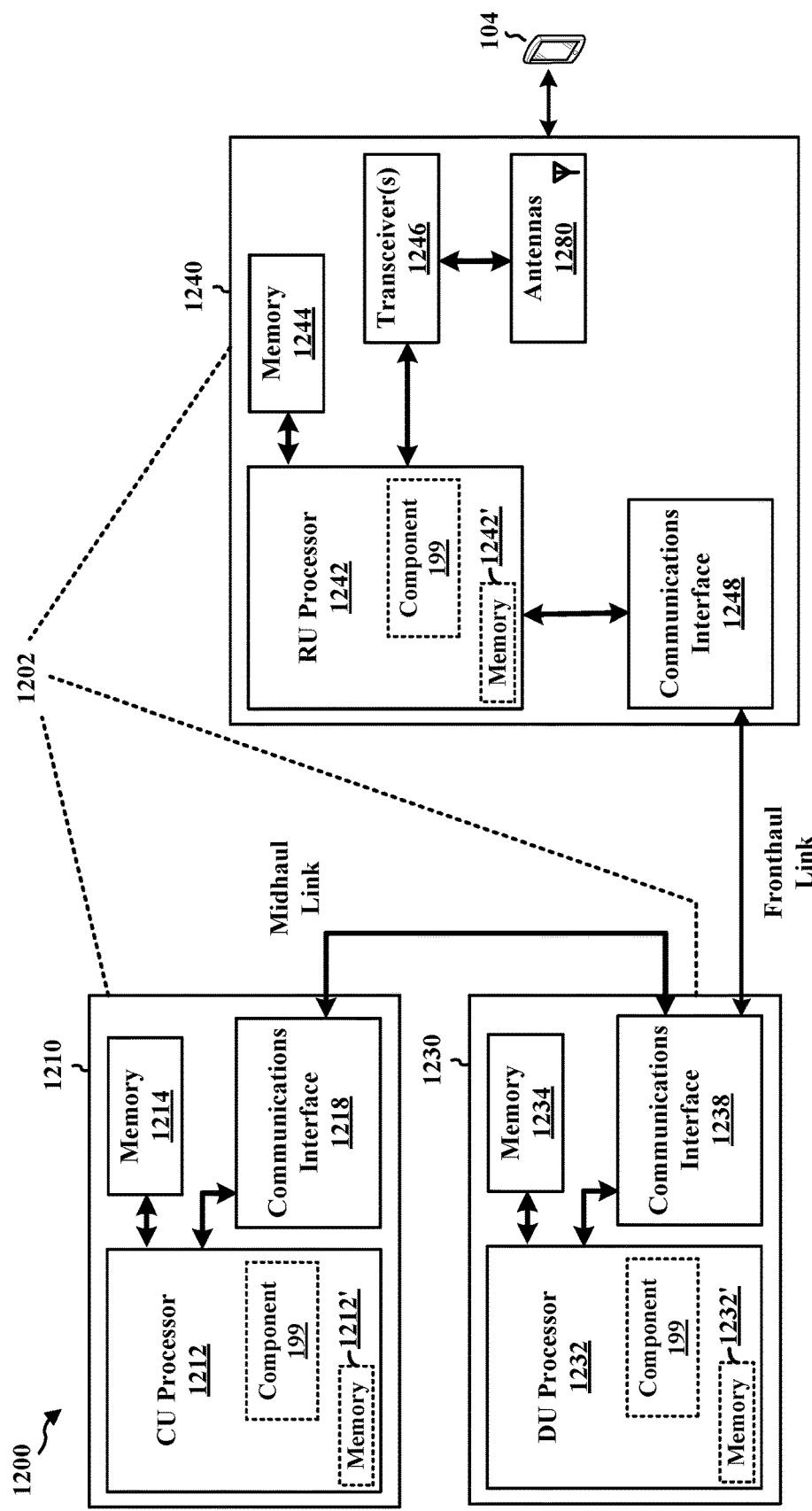
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the ULCCI component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the ULCCI component 199 may be configured to transmit, based on a first UL communication associated with a first wireless device and a second UL communication associated with a second wireless device being scheduled for a same UL resource, a CCI for the second UL communication of the second wireless device and to receive at least the first UL communication. The ULCCI component 199 may be within one or more processors of one or more of the CU 1210, DU 1230, and the RU 1240. The ULCCI component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for transmitting, based on a first UL communication associated with a first wireless device and a second UL communication associated with a second wireless device being scheduled for a same UL resource, a CCI for the second UL communication of the second wireless device. The network entity 1202 may include means for receiving at least the first UL communication. The network entity 1202 may include means for receiving the second UL communication. The network entity 1202 may include means for receiving a first indication that the CCI for the second UL communication has been one of accepted or rejected. The network entity 1202 may include means for monitoring a subsequent UL resource associated with the second wireless device associated with the second UL communication. The network entity 1202 may include means for indicating, via at least one of an RRC message, a MAC-CE, or DCI, for the second wireless device to interpret control information as the CCI. The means may be the ULCCI component 199 of the network entity 1202 configured to perform the functions described in relation to FIGS. 7 and 8 or recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communication, 5 G NR (e.g., Rel 16 and higher), a network node (e.g., a base station, eNB, gNB, etc.) may transmit an ULCI designed to improve URLLC performance for a first wireless device. For example, the network node may cancel an UL resource previously assigned to an eMBB service (for a second wireless device) for an URLLC UL transmission from the first wireless device. In some aspects, canceling eMBB UL transmissions in favor of URLLC UL transmissions may generally improve the URLLC performance without a significant impact on the eMBB performance (the eMBB UL transmission may be retransmitted before a PDB is exceeded). However, for services that may be less sensitive to delay than URLLC, but more sensitive to delay than eMBB (e.g., with a PDB of approximately 10 ms such as XR or other current or future services), canceling UL transmissions in favor of URLLC UL transmissions may degrade performance of the service more than the URLLC performance is improved. Using XR as an example, a scheduled URLLC UL transmission from a first wireless device may have 4 ms remaining of a nominal PDB of 5 ms and an XR UL transmission from a second wireless device may be scheduled for a same (or overlapping) set of resources and have 2 ms remaining of a nominal PDB of 10 ms. While the URLLC may have higher priority, in some situations, it may be the case that the XR service may be negatively impacted (e.g., may experience a failed transmission) without providing a corresponding benefit to the URLLC service (e.g., the URLLC UL transmission had sufficient time for a retransmission before the expiration of the PDB).

Accordingly, a method and apparatus may provide, based on identifying a first (URLLC) UL transmission that may conflict and/or collide with a second UL (XR or other service) transmission, a CCI to a wireless device. The CCI, in some aspects, may indicate the set of resources associated with the first UL transmission and a set of criteria for a wireless device to determine whether to cancel the second UL transmission. The set of criteria, in some aspects, may relate to one or more of a remaining PDB of the first transmission, a measured, and/or reported, channel quality (e.g., a SNR, a SINR, or other channel quality measure), a power or energy, a delay parameter, or other characteristic of the first transmission that may be considered to determine an effect of canceling the second transmission in favor of the first transmission.

In some aspects, the method and apparatus may provide less delay compared to a solution that requires a network node to request a report from a wireless device about the experienced UL delay and then decide whether to cancel or not at the network node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network device, including transmitting, based on a first UL communication associated with a first wireless device and a second UL communication associated with a second wireless device being scheduled for a same UL resource, a CCI for the second UL communication of the second wireless device and receiving at least the first UL communication.

Aspect 2 is the method of aspect 1, receiving the second UL communication.

Aspect 3 is the method of any of aspects 1 and 2, where the CCI is associated with a set of criteria for the second wireless device to determine whether to cancel the second UL communication.

Aspect 4 is the method of aspect 3, where the set of criteria are included in at least one of the CCI or a configuration indicating the set of criteria that applies to the CCI.

Aspect 5 is the method of any of aspects 3 and 4, where the set of criteria relate to one or more of: a packet delay experienced at the first wireless device associated with the first UL communication, a time from an initial transmission of the first UL communication, a PDB associated with the first UL communication, a remaining PDB associated with the first UL communication, or an energy parameter.

Aspect 6 is the method of aspect 5, where at least one criteria in the set of criteria is associated with multiple threshold values including at least a first threshold value and a second threshold value.

Aspect 7 is the method of aspect 6, further including receiving a first indication that the CCI for the second UL communication has been one of accepted or rejected and monitoring a subsequent UL resource associated with the second wireless device associated with the second UL communication.

Aspect 8 is the method of any of aspects 1 to 7, further including indicating, via at least one of a RRC message, a MAC-CE, or DCI, for the second wireless device to interpret control information as the CCI.

Aspect 9 is the method of aspect 8, where the CCI is included in an additional DCI, where the additional DCI is interpreted as being the CCI instead of a non-conditional CI based on at least one of the RRC message, the MAC-CE, the DCI, a first format of the CCI being different from a second format associated with the non-conditional CI, or a first RNTI associated with the additional DCI being different from a second RNTI associated with a non-conditional CI DCI.

Aspect 10 is the method of any of aspects 1 to 9, where the CCI further indicates at least one alternate UL resource for transmission of the second UL communication.

Aspect 11 is the method of any of aspects 1 to 10, where transmitting the CCI for the second UL communication is based on one or more of: a first set of reported delay statistics associated with the first UL communication, a second set of reported delay statistics associated with the second UL communication, a first traffic-type associated with the first UL communication, a second traffic-type associated with the second UL communication, a first priority associated with the first UL communication, a second priority associated with the second UL communication, a first measured or predicted SINR associated with the first UL communication, a second measured or predicted SINR associated with the second UL communication, a first reported or predicted power information associated with the first UL communication, or a second reported or predicted power information associated with the second UL communication.

Aspect 12 is the method of aspect 11, where at least one of the first reported or predicted power information associated with the first UL communication or the second reported or predicted power information associated with the second UL communication includes one or more of: a charging rate profile, a discharging rate profile, or an energy level profile, where a profile includes a current value associated with a current time and one or more predicted values associated with a corresponding one or more future times.

Aspect 13 is a method of wireless communication at a UE, including receiving a CCI for an UL communication scheduled via a first UL resource, skipping transmitting the UL communication via the first UL resource when a condition is met, and transmitting the UL communication via the first UL resource when the condition is not met.

Aspect 14 is the method of aspect 13, where the CCI is associated with a set of criteria for determining whether to skip the UL communication.

Aspect 15 is the method of aspect 14, where the set of criteria relate to one or more of: a first packet delay experienced at an additional wireless device associated with an additional UL communication scheduled for transmission via the first UL resource, a first time from a first initial transmission of the additional UL communication, a first PDB associated with the additional UL communication, a first remaining PDB associated with the additional UL communication, or an energy parameter.

Aspect 16 is the method of aspect 15, further including determining whether to skip or transmit the UL communication based on one or more of: a second packet delay experienced at the wireless device, a second time from a second initial transmission of the UL communication, a second remaining PDB associated with the UL communication, whether alternative transmission resources are available to transmit the UL communication, a SINR associated with the UL communication, a charging rate profile of the wireless device, a discharging rate profile of the wireless device, or an energy level profile of the wireless device.

Aspect 17 is the method of aspect 16, where the charging rate profile, the discharging rate profile, and the energy level profile of the wireless device include a current value associated with a current time and one or more predicted values associated with a corresponding one or more future times.

Aspect 18 is the method of any of aspects 15 to 17, where at least one criteria in the set of criteria is associated with multiple threshold values including at least a first threshold value and a second threshold value.

Aspect 19 is the method of aspect 18, further including transmitting a first indication that the CCI for the UL communication has been one of accepted or rejected and determining, based on at least one of the first threshold value or the second threshold value and a related value at the wireless device, whether to transmit or omit an additional transmission and a content of the additional transmission, where the content of the additional transmission includes one of a first additional indication of a remaining PDB of the UL communication, or a second additional indication of a delay status associated with the wireless device.

Aspect 20 is the method of any of aspects 14 to 19, further including receiving an indication, via at least one of a RRC message, a MAC-CE, or a DCI, to interpret control information as the CCI.

Aspect 21 is the method of aspect 20, where the set of criteria are included in at least one of the CCI or the set of criteria are indicated by the indication for application to the CCI.

Aspect 22 is the method of any of aspects 20 and 21, where the CCI is included in an additional DCI, further including interpreting the additional DCI as being the CCI instead of a non-conditional CI based on at least one of: the indication, a first format of the CCI being different from a second format associated with the non-conditional CI, or a first RNTI associated with the additional DCI being different from a second RNTI associated with a non-conditional CI DCI.

Aspect 23 is the method of any of aspects 13 to 22, where the CCI further indicates at least one alternate UL resource for transmission of the UL communication.

Aspect 24 is an apparatus for wireless communication at a device including a memory and at least one processor coupled to the memory and, based at least in part on information stored in the memory, the at least one processor is configured to implement any of aspects 1 to 23.

Aspect 25 is the method of aspect 24, further including a transceiver or an antenna coupled to the at least one processor.

Aspect 26 is an apparatus for wireless communication at a device including means for implementing any of aspects 1 to 23.

Aspect 27 is a computer-readable medium (e.g., a non-transitory computer-readable medium) storing computer executable code, where the code when executed by a processor causes the processor to implement any of aspects 1 to 23.

What is claimed is:

1. An apparatus for wireless communication at a network device, comprising:
    a memory; and
    at least one processor coupled to the memory and, based at least in part on information stored in the memory, the at least one processor is configured to:
        transmit, based on a first uplink (UL) communication associated with a first wireless device and a second UL communication associated with a second wireless device being scheduled for a same UL resource, a conditional cancellation indication (CCI) for the second UL communication of the second wireless device; and
        receive at least the first UL communication.

2. The apparatus of claim 1, the at least one processor configured to:
    receive the second UL communication.

3. The apparatus of claim 1, wherein the CCI is associated with a set of criteria for the second wireless device to determine whether to cancel the second UL communication.

4. The apparatus of claim 3, wherein the set of criteria are comprised in at least one of the CCI or a configuration indicating the set of criteria that applies to the CCI.

5. The apparatus of claim 3, wherein the set of criteria relate to one or more of:
    a packet delay experienced at the first wireless device associated with the first UL communication,
    a time from an initial transmission of the first UL communication,
    a packet delay budget (PDB) associated with the first UL communication,
    a remaining PDB associated with the first UL communication, or
    an energy parameter.

6. The apparatus of claim 5, wherein at least one criteria in the set of criteria is associated with multiple threshold values including at least a first threshold value and a second threshold value.

7. The apparatus of claim 6, the at least one processor configured to:
    receive a first indication that the CCI for the second UL communication has been one of accepted or rejected; and
    monitor a subsequent UL resource associated with the second wireless device associated with the second UL communication.

8. The apparatus of claim 1, the at least one processor configured to:
    indicate, via at least one of a radio resource control (RRC) message, a medium access control (MAC) control element (CE) (MAC-CE), or downlink control information (DCI), for the second wireless device to interpret control information as the CCI.

9. The apparatus of claim 8, wherein the CCI is comprised in an additional DCI, wherein the additional DCI is interpreted as being the CCI instead of a non-conditional CI based on at least one of the RRC message, the MAC-CE, the DCI, a first format of the CCI being different from a second format associated with the non-conditional CI, or a first radio network temporary identifier (RNTI) associated with the additional DCI being different from a second RNTI associated with a non-conditional CI DCI.

10. The apparatus of claim 1, wherein the CCI further indicates at least one alternate UL resource for transmission of the second UL communication.

11. The apparatus of claim 1, wherein to transmit the CCI for the second UL communication, the at least one processor is configured to transmit the CCI based on one or more of:
    a first set of reported delay statistics associated with the first UL communication,
    a second set of reported delay statistics associated with the second UL communication,
    a first traffic-type associated with the first UL communication,
    a second traffic-type associated with the second UL communication,
    a first priority associated with the first UL communication,
    a second priority associated with the second UL communication,
    a first measured or predicted signal to interference and noise ratio (SINR) associated with the first UL communication,
    a second measured or predicted SINR associated with the second UL communication,
    a first reported or predicted power information associated with the first UL communication, or
    a second reported or predicted power information associated with the second UL communication.

12. The apparatus of claim 11, wherein at least one of the first reported or predicted power information associated with the first UL communication or the second reported or predicted power information associated with the second UL communication comprises one or more of:
  a charging rate profile,
  a discharging rate profile, or
  an energy level profile, wherein a profile comprises a current value associated with a current time and one or more predicted values associated with a corresponding one or more future times.

13. An apparatus for wireless communication at a wireless device, comprising:
  a memory; and
  at least one processor coupled to the memory and, based at least in part on information stored in the memory, the at least one processor is configured to:
  receive a conditional cancellation indication (CCI) for an uplink (UL) communication scheduled via a first UL resource;
  skip transmitting the UL communication via the first UL resource when a condition is met; and
  transmit the UL communication via the first UL resource when the condition is not met.

14. The apparatus of claim 13, wherein the CCI is associated with a set of criteria for determining whether to skip the UL communication.

15. The apparatus of claim 14, wherein the set of criteria relate to one or more of:
  a first packet delay experienced at an additional wireless device associated with an additional UL communication scheduled for transmission via the first UL resource,
  a first time from a first initial transmission of the additional UL communication,
  a packet delay budget (PDB) associated with the additional UL communication,
  a first remaining PDB associated with the additional UL communication, or
  an energy parameter.

16. The apparatus of claim 15, the at least one processor is further configured to:
  determine whether to skip or transmit the UL communication based on one or more of:
  a second packet delay experienced at the wireless device,
  a second time from a second initial transmission of the UL communication,
  a second remaining PDB associated with the UL communication,
  whether alternative transmission resources are available to transmit the UL communication,
  a signal to noise and interference (SINR) associated with the UL communication,
  a charging rate profile of the wireless device, a discharging rate profile of the wireless device, or
  an energy level profile of the wireless device.

17. The apparatus of claim 16, wherein the charging rate profile, the discharging rate profile, and the energy level profile of the wireless device comprise a current value associated with a current time and one or more predicted values associated with a corresponding one or more future times.

18. The apparatus of claim 15, wherein at least one criteria in the set of criteria is associated with multiple threshold values including at least a first threshold value and a second threshold value.

19. The apparatus of claim 18, the at least one processor is further configured to:
  transmit a first indication that the CCI for the UL communication has been one of accepted or rejected; and
  determine, based on at least one of the first threshold value or the second threshold value and a related value at the wireless device, whether to transmit or omit an additional transmission and a content of the additional transmission, wherein the content of the additional transmission comprises one of a first additional indication of a second remaining PDB of the UL communication, or a second additional indication of a delay status associated with the wireless device.

20. The apparatus of claim 14, the at least one processor is further configured to:
  receive an indication, via at least one of a radio resource control (RRC) message, a medium access control (MAC) control element (CE) (MAC-CE), or a downlink control information (DCI), to interpret control information as the CCI.

21. The apparatus of claim 20, wherein the set of criteria are comprised in at least one of the CCI or the set of criteria are indicated by the indication for application to the CCI.

22. The apparatus of claim 20, wherein the CCI is comprised in an additional DCI, the at least one processor is further configured to:
  interpret the additional DCI as being the CCI instead of a non-conditional CI based on at least one of:
  the indication,
  a first format of the CCI being different from a second format associated with the non-conditional CI, or
  a first radio network temporary identifier (RNTI) associated with the additional DCI being different from a second RNTI associated with a non-conditional CI DCI.

23. The apparatus of claim 13, wherein the CCI further indicates at least one alternate UL resource for transmission of the UL communication.

24. A method of communication at a network device, comprising:
  transmitting, based on a first uplink (UL) communication associated with a first wireless device and a second UL communication associated with a second wireless device being scheduled for a same UL resource, a conditional cancellation indication (CCI) for the second UL communication of the second wireless device; and
  receiving at least the first UL communication.

25. The method of claim 24, further comprising:
  receiving the second UL communication.

26. The method of claim 24, wherein the CCI is associated with a set of criteria for the second wireless device to determine whether to cancel the second UL communication, wherein the set of criteria are comprised in at least one of the CCI or a configuration indicating the set of criteria that applies to the CCI and wherein the set of criteria relate to one or more of:
  a packet delay experienced at the first wireless device associated with the first UL communication,
  a time from an initial transmission of the first UL communication,
  a packet delay budget (PDB) associated with the first UL communication,
  a remaining PDB associated with the first UL communication, or
  an energy parameter.

27. A method of communication at a wireless device, comprising:
- receiving a conditional cancellation indication (CCI) for an uplink (UL) communication scheduled via a first UL resource;
- skipping transmitting the UL communication via the first UL resource when a condition is met; and
- transmitting the UL communication via the first UL resource when the condition is not met.

28. The method of claim 27, wherein the CCI is associated with a set of criteria for determining whether to skip the UL communication, and wherein the set of criteria relate to one or more of:
- a first packet delay experienced at an additional wireless device associated with an additional UL communication scheduled for transmission via the first UL resource,
- a first time from a first initial transmission of the additional UL communication,
- a packet delay budget (PDB) associated with the additional UL communication,
- a first remaining PDB associated with the additional UL communication, or
- an energy parameter.

29. The method of claim 28, further comprising:
- determining whether to skip or transmit the UL communication based on one or more of:
- a second packet delay experienced at the wireless device,
- a second time from a second initial transmission of the UL communication,
- a second remaining PDB associated with the UL communication,
- whether alternative transmission resources are available to transmit the UL communication,
- a signal to noise and interference (SINR) associated with the UL communication,
- a charging rate profile of the wireless device, a discharging rate profile of the wireless device, or
- an energy level profile of the wireless device.

30. The method of claim 28, wherein the CCI is comprised in an additional DCI, further comprising:
- receiving an indication, via at least one of a radio resource control (RRC) message, a medium access control (MAC) control element (CE) (MAC-CE), or a downlink control information (DCI), to interpret control information as the CCI, wherein the set of criteria are comprised in at least one of the CCI or the set of criteria are indicated by the indication for application to the CCI; and
- interpreting the additional DCI as being the CCI instead of a non-conditional CI based on at least one of:
  - the indication,
  - a first format of the CCI being different from a second format associated with the non-conditional CI, or
  - a first radio network temporary identifier (RNTI) associated with the additional DCI being different from a second RNTI associated with a non-conditional CI DCI.

* * * * *